US011976428B2

(12) United States Patent
Owens

(10) Patent No.: US 11,976,428 B2
(45) Date of Patent: May 7, 2024

(54) METHOD FOR ACTUATING A BARRIER

(71) Applicant: Delta Scientific Corporation, Palmdale, CA (US)

(72) Inventor: Matthew Owens, Glendale, CA (US)

(73) Assignee: DELTA SCIENTIFIC CORPORATION, Palmdale, CA (US)

( * ) Notice: Subject to any disclaimer, the term of this patent is extended or adjusted under 35 U.S.C. 154(b) by 0 days.

(21) Appl. No.: 18/352,908

(22) Filed: Jul. 14, 2023

(65) Prior Publication Data

US 2023/0358003 A1  Nov. 9, 2023

Related U.S. Application Data

(62) Division of application No. 17/009,666, filed on Sep. 1, 2020, now Pat. No. 11,725,354.

(51) Int. Cl.
*E01F 13/08* (2006.01)
*F16H 21/54* (2006.01)

(52) U.S. Cl.
CPC ............. *E01F 13/08* (2013.01); *F16H 21/54* (2013.01)

(58) Field of Classification Search
CPC .................................. E01F 13/08; F16H 21/54
See application file for complete search history.

(56) References Cited

U.S. PATENT DOCUMENTS

| 4,850,737 | A | 7/1989 | Nasatka et al. |
| 7,118,304 | B2 | 10/2006 | Turpin et al. |
| 7,320,557 | B1 | 1/2008 | Potter |
| 8,439,594 | B1 | 5/2013 | Clark et al. |
| 9,771,696 | B2 | 9/2017 | Neusch |
| 9,856,615 | B1 | 1/2018 | Neusch |
| 10,094,082 | B2 | 10/2018 | Neusch |
| 11,365,955 | B2 | 6/2022 | Downing et al. |
| 2004/0033106 | A1 | 2/2004 | Turpin et al. |
| 2006/0078378 | A1* | 4/2006 | Burns .................... E01F 13/123 |
| | | | 404/6 |
| 2010/0196093 | A1 | 8/2010 | Seeglitz et al. |
| 2014/0234024 | A1* | 8/2014 | Brackin .................... E01F 13/08 |
| | | | 404/6 |
| 2016/0115661 | A1* | 4/2016 | Neusch .................... E01F 13/08 |
| | | | 404/6 |
| 2018/0023263 | A1 | 1/2018 | Rothschild |
| 2019/0257045 | A1 | 8/2019 | Bock, II et al. |

* cited by examiner

*Primary Examiner* — Abigail A Risic
(74) *Attorney, Agent, or Firm* — LEWIS ROCA ROTHGERBER CHRISTIE LLP

(57) ABSTRACT

A barricade includes a foundation frame, a finger wedge barrier, a hinge hingedly coupling the finger wedge barrier to the foundation frame, and an actuator mechanism coupled to the foundation frame and the finger wedge barrier. The finger wedge barrier is configured to rotate about the hinge between a stowed configuration and a deployed configuration, and the actuator mechanism is configured to rotate the finger wedge barrier between the stowed configuration and the deployed configuration. The actuator mechanism includes an actuator comprising a housing and a rod configured to reciprocally move in the housing, a first linkage having a first end rotatably coupled to the rod and a second end rotatably coupled to the finger wedge barrier, and a second linkage having a first end rotatably coupled to the rod and a second end rotatably coupled to the foundation frame.

15 Claims, 21 Drawing Sheets

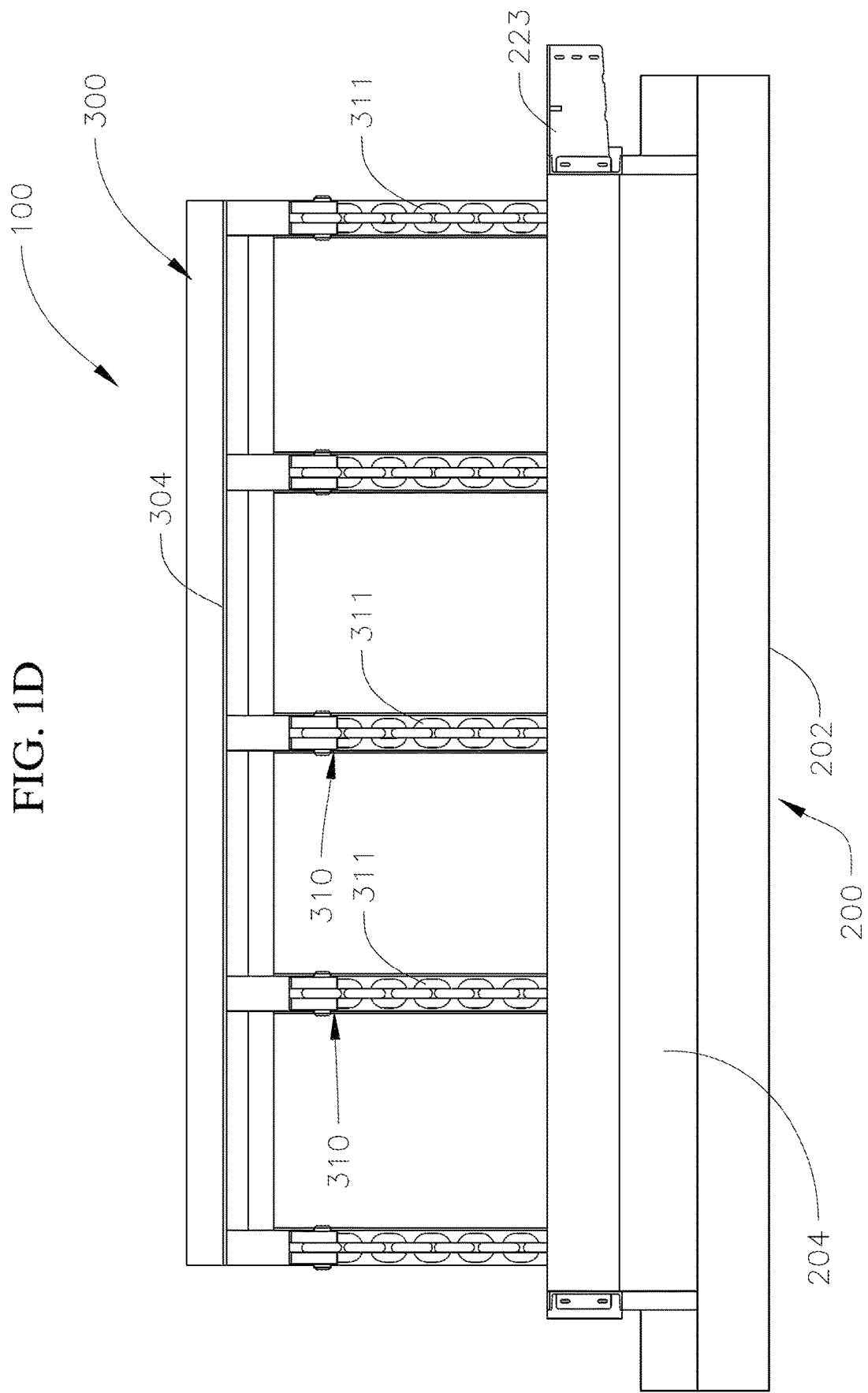

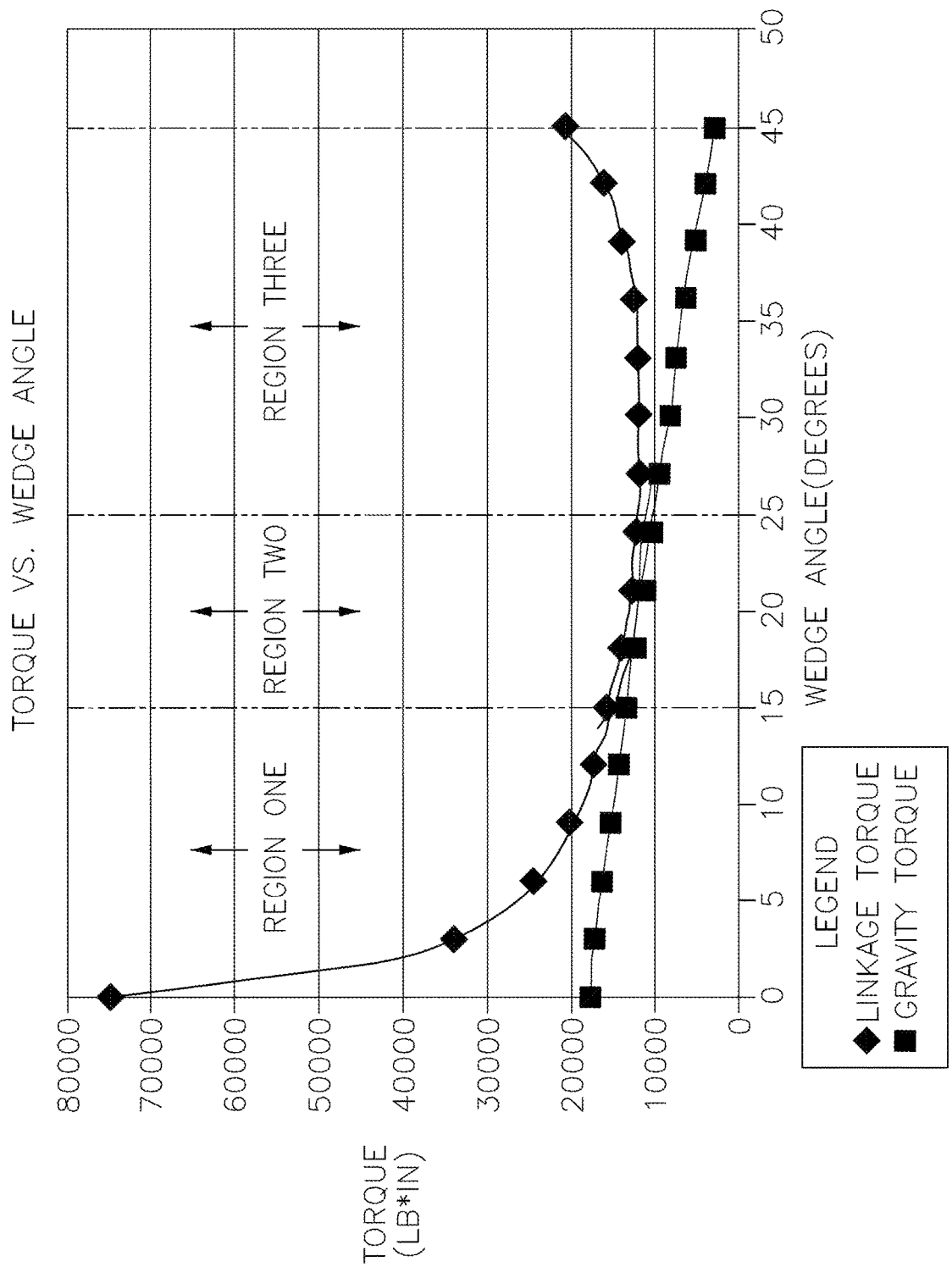

METHOD FOR ACTUATING A BARRIER

CROSS REFERENCE TO RELATED APPLICATION

This application is a divisional of U.S. patent application Ser. No. 17/009,666, filed Sep. 1, 2020, now U.S. Pat. No. 11,725,354, the contents of which are hereby incorporated by reference in its entirety.

BACKGROUND

1. Field

The present application relates generally to mechanisms for actuating a barrier and barriers including an actuator mechanism.

2. Description of the Related Art

Barricades are commonly utilized to prevent unauthorized vehicular traffic from passing through a roadway. Some barricades have a static (i.e., fixed) configuration such as bollards, and other barricades are configured to move between a stowed position in which vehicular traffic is capable of passing over the barricade and a deployed position in which vehicular traffic is prevented from passing over the barricade. For instance, a finger wedge type barricade includes a foundation frame, a finger wedge barrier, and an actuator configured to rotate the finer wedge barrier relative to the foundation frame.

In some conventional finger barriers, the actuator is directly coupled to the finger wedge barrier and the angle between the actuator and the finger wedge barrier is relatively low. For instance, in some conventional barricades, the actuator is parallel or substantially parallel to the finger wedge barrier. Accordingly, these conventional barriers have relatively low mechanical advantage when the barrier is in the stowed position, and therefore it requires a relatively high amount of force to begin moving the barrier into the deployed position and/or the acceleration of the barrier out of the stowed configuration is relatively slow.

Additionally, in conventional barriers in which the actuator is directly coupled to the finger wedge barrier, the actuator may experience a high shock when a vehicle passes over the barricade in the stowed configuration (i.e., the shock from a vehicle passing over the barricade is not attenuated before being transmitted to the actuator). Accordingly, the high degree of shock transmitted to the actuator may prematurely wear or break the actuator and/or the actuator brake.

SUMMARY

The present disclosure relates to various embodiments of a barricade. In one embodiment, the barricade includes a foundation frame, a finger wedge barrier, a hinge hingedly coupling the finger wedge barrier to the foundation frame, and an actuator mechanism coupled to the foundation frame and the finger wedge barrier. The actuator mechanism configured to rotate the finger wedge barrier between a stowed configuration and a deployed configuration. The actuator mechanism includes an actuator including a housing and a rod configured to reciprocally move in the housing, a first linkage having a first end rotatably coupled to the rod and a second end rotatably coupled to the finger wedge barrier, and a second linkage having a first end rotatably coupled to the rod and a second end rotatably coupled to the foundation frame.

The actuator may be a hydraulic actuator or an electromechanical actuator.

When the finger wedge barrier is in the stowed configuration, an angle between the finger wedge barrier and the first linkage may be greater than an angle between the finger wedge barrier and the actuator. When the finger wedge barrier is in the stowed configuration, the angle between the finger wedge barrier and the actuator may be substantially zero. Additionally, when the finger wedge barrier is in the stowed configuration, the angle between the finger wedge barrier and the first linkage may be in a range from approximately 30 degrees to approximately 60 degrees.

The actuator may be hingedly coupled to the foundation frame.

The first linkage of the actuator mechanism may be coupled to the finger wedge barrier between the hinge and a rear end of the finger wedge barrier.

When the finger wedge barrier is in the stowed configuration, the rod of the actuator may be in an extended position, and the rod of the actuator may be configured to pull the rear end of the finger wedge barrier downward to move the finger wedge barrier into the deployed configuration.

When the finger wedge barrier is in the deployed configuration, the rod of the actuator may be in a retracted position, and the rod of the actuator may be configured to push the rear end of the finger wedge barrier upward to move the finger wedge barrier into the stowed configuration.

A difference between a torque supplied to the finger wedge barrier by the actuator mechanism and a gravitational torque acting on the finger wedge barrier may be greater when the finger wedge barrier is in the stowed configuration than when the finger wedge barrier is in an intermediate configuration between the stowed configuration and the deployed configuration.

A difference between a torque supplied to the finger wedge barrier by the actuator mechanism and a gravitational torque acting on the finger wedge barrier may be greater when the finger wedge barrier is in the deployed configuration than when the finger wedge barrier is in an intermediate configuration between the stowed configuration and the deployed configuration.

The barricade may also include at least one retention member connecting a front end portion of the finger wedge barrier to the foundation frame.

The present disclosure also relates to various embodiments of an actuator mechanism configured to move a barricade between a stowed configuration and a deployed configuration. In one embodiment, the actuator mechanism includes an actuator having a housing and a rod configured to reciprocally move in the housing, a first linkage having a first end rotatably coupled to the rod and a second end configured to be rotatably coupled to a moveable component of the barricade, and a second linkage having a first end rotatably coupled to the rod and a second end configured to be rotatably coupled to a static component of the barricade.

The actuator may be a hydraulic actuator or an electromechanical actuator.

The first linkage of the actuator mechanism may be longer than the second linkage.

The actuator mechanism may also include an actuator support member hingedly coupling the actuator to the static component of the barricade.

The rod of the actuator may be configured to pull the first and second linkages and rotate the first and second linkages toward each other to move the barricade into the deployed configuration.

The rod of the actuator may be configured to push the first and second linkages and rotate the first and second linkages away from each other to move the barricade into the stowed configuration.

According to another embodiment of the present disclosure, the barricade includes a foundation frame, a finger wedge barrier hingedly coupled to the foundation frame about a hinge, the finger wedge barrier configured to rotate about the hinge between a stowed configuration and a deployed configuration, and an actuator mechanism coupled to a rear end portion of the finger wedge barrier between the hinge and a rear end of the finger wedge barrier. The actuator mechanism is configured to pull the rear end of the finger wedge barrier downward to move the finger wedge barrier into the deployed configuration, and the actuator mechanism is configured to push the rear end of the finger wedge barrier upward to move the finger wedge barrier into the stowed configuration.

The actuator mechanism may include an actuator including a housing and a rod configured to reciprocally move in the housing, a first linkage having a first end rotatably coupled to the rod and a second end rotatably coupled to the rear end portion of the finger wedge barrier, and a second linkage having a first end rotatably coupled to the rod and a second end rotatably coupled to the foundation frame.

The actuator may be a hydraulic actuator or an electromechanical actuator.

The actuator may be hingedly coupled to the foundation frame.

When the finger wedge barrier is in the stowed configuration, an angle between the finger wedge barrier and the first linkage may be greater than an angle between the finger wedge barrier and the actuator.

When the finger wedge barrier is in the stowed configuration, the angle between the finger wedge barrier and the actuator may be substantially zero, and the angle between the finger wedge barrier and the first linkage may be in a range from approximately 30 degrees to approximately 60 degrees.

A difference between a torque supplied to the finger wedge barrier by the actuator mechanism and a gravitational torque acting on the finger wedge barrier may be greater when the finger wedge barrier is in the stowed configuration than when the finger wedge barrier is in an intermediate configuration between the stowed configuration and the deployed configuration.

A difference between a torque supplied to the finger wedge barrier by the actuator mechanism and a gravitational torque acting on the finger wedge barrier may be greater when the finger wedge barrier is in the deployed configuration than when the finger wedge barrier is in an intermediate configuration between the stowed configuration and the deployed configuration.

The present disclosure also relates to various embodiments of a method actuating a rotatable component of a barricade between a stowed configuration and a deployed configuration. In one embodiment, the method includes pulling, with an actuator mechanism including an actuator and a linkage, a rear end portion of the rotatable component downward to move the rotatable component into the deployed configuration, and pushing, with the actuator mechanism, the rear end portion of the rotatable component upward to move the rotatable component into the stowed configuration.

The rotatable component of the barricade may be a finger wedge barrier.

When the rotatable component is in the stowed configuration, an angle between the linkage and the rotatable component may be greater than an angle between the actuator and the rotatable component.

A difference between a torque supplied to the rotatable component by the actuator mechanism and a gravitational torque acting on the rotatable component may be greater when the rotatable component is in the stowed configuration than when the rotatable component is in an intermediate configuration between the stowed configuration and the deployed configuration.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable barricade.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 1B-1G are a front perspective view, a top-down perspective view, a front view, a side cross-sectional view, and first and second rear perspective views, respectively, of the barricade including the foundation frame, the finger wedge barrier, and the actuator mechanism according to the embodiment illustrated in FIG. 1A in the deployed configuration;

FIG. 6 is a graph depicting the torque imparted by actuator as a function of the angle of the barricade according to one embodiment of the present disclosure, and the gravitational torque that must be overcome by the actuator to move the barricade into the deployed configuration.

DETAILED DESCRIPTION

Figure 1A:
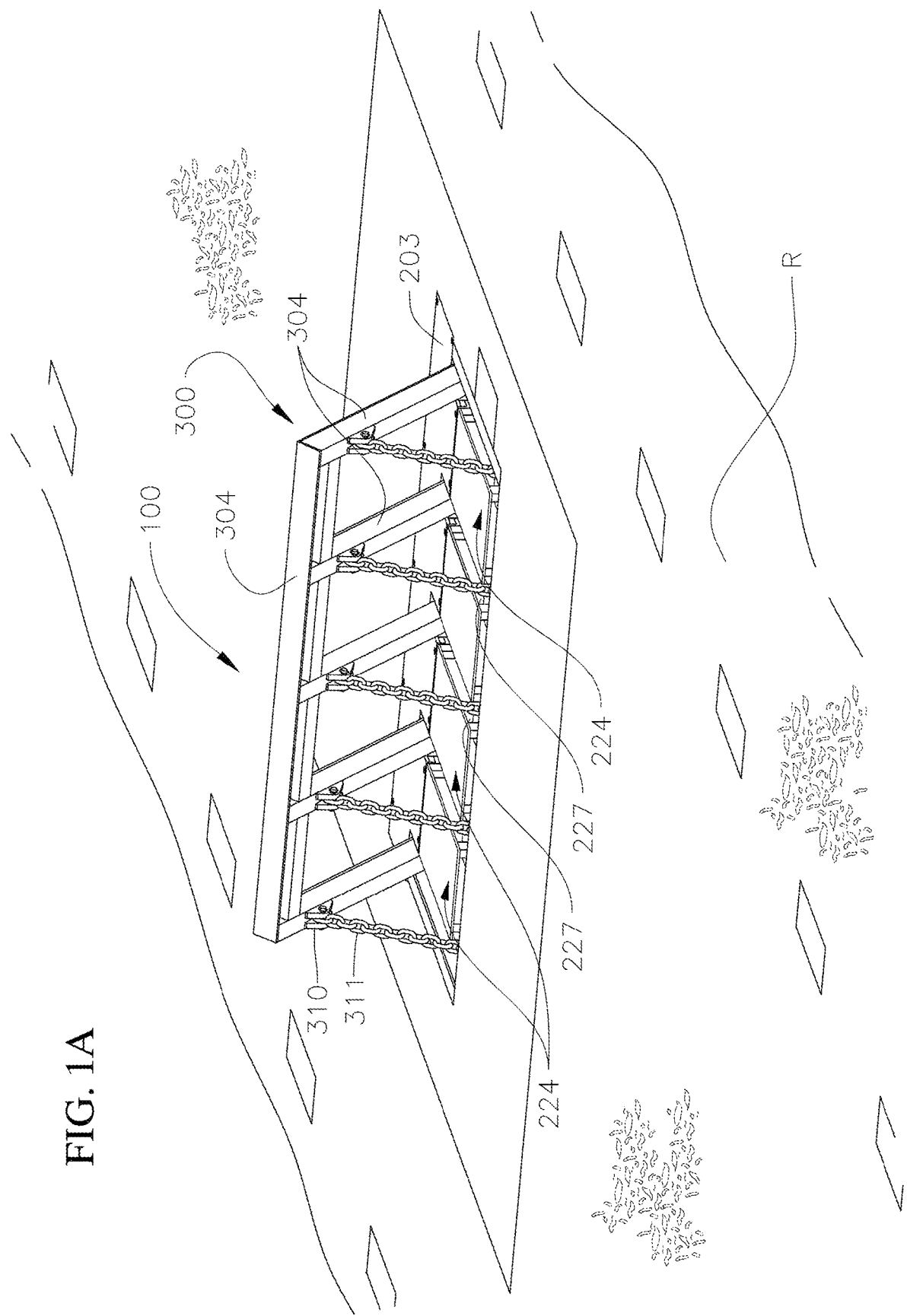
FIG. 1A is a perspective view of a barricade including a foundation frame, a finger wedge barrier, and an actuator mechanism according to one embodiment of the present disclosure in a deployed configuration and installed in a roadway.
Figure 1B:
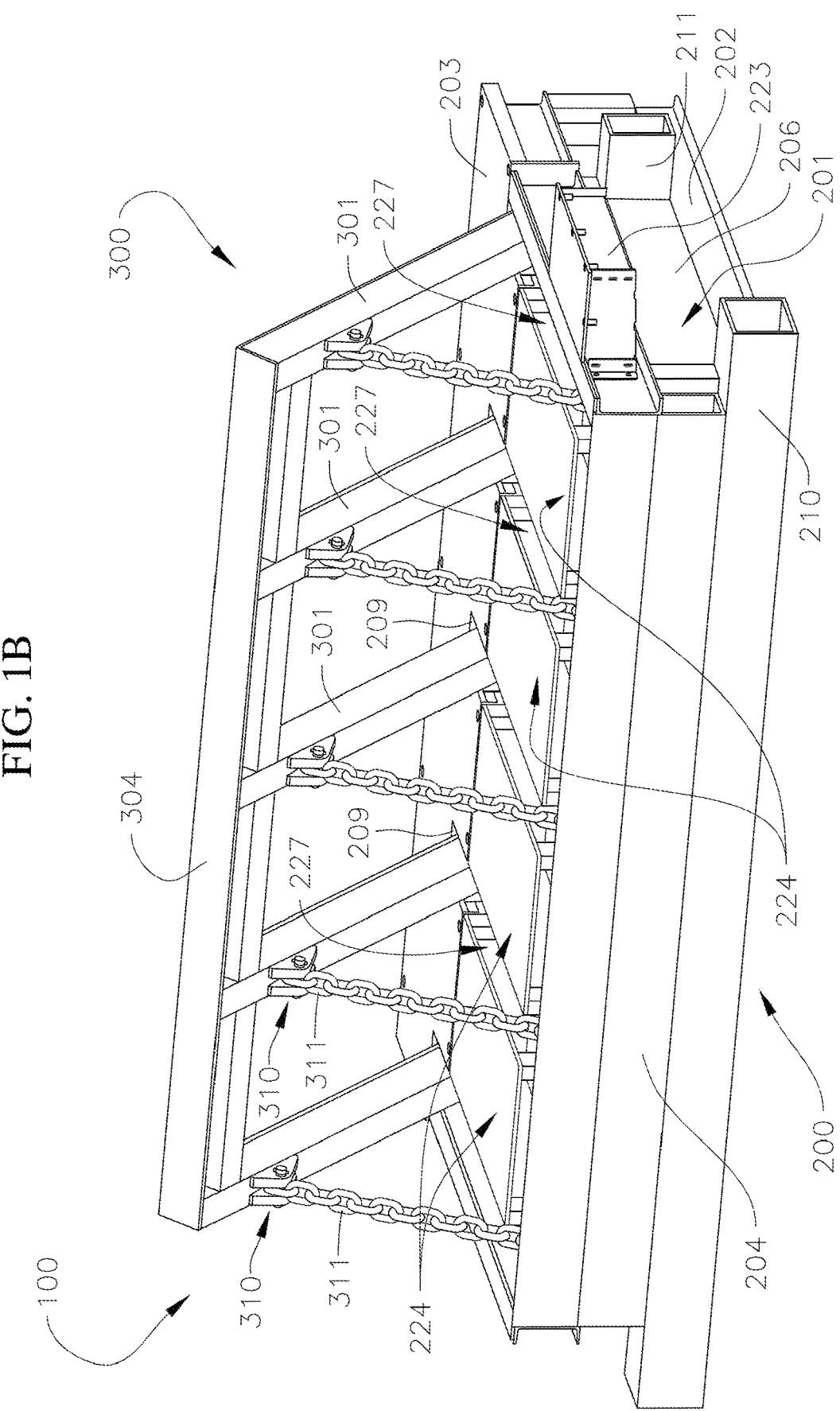
Figure 1C:
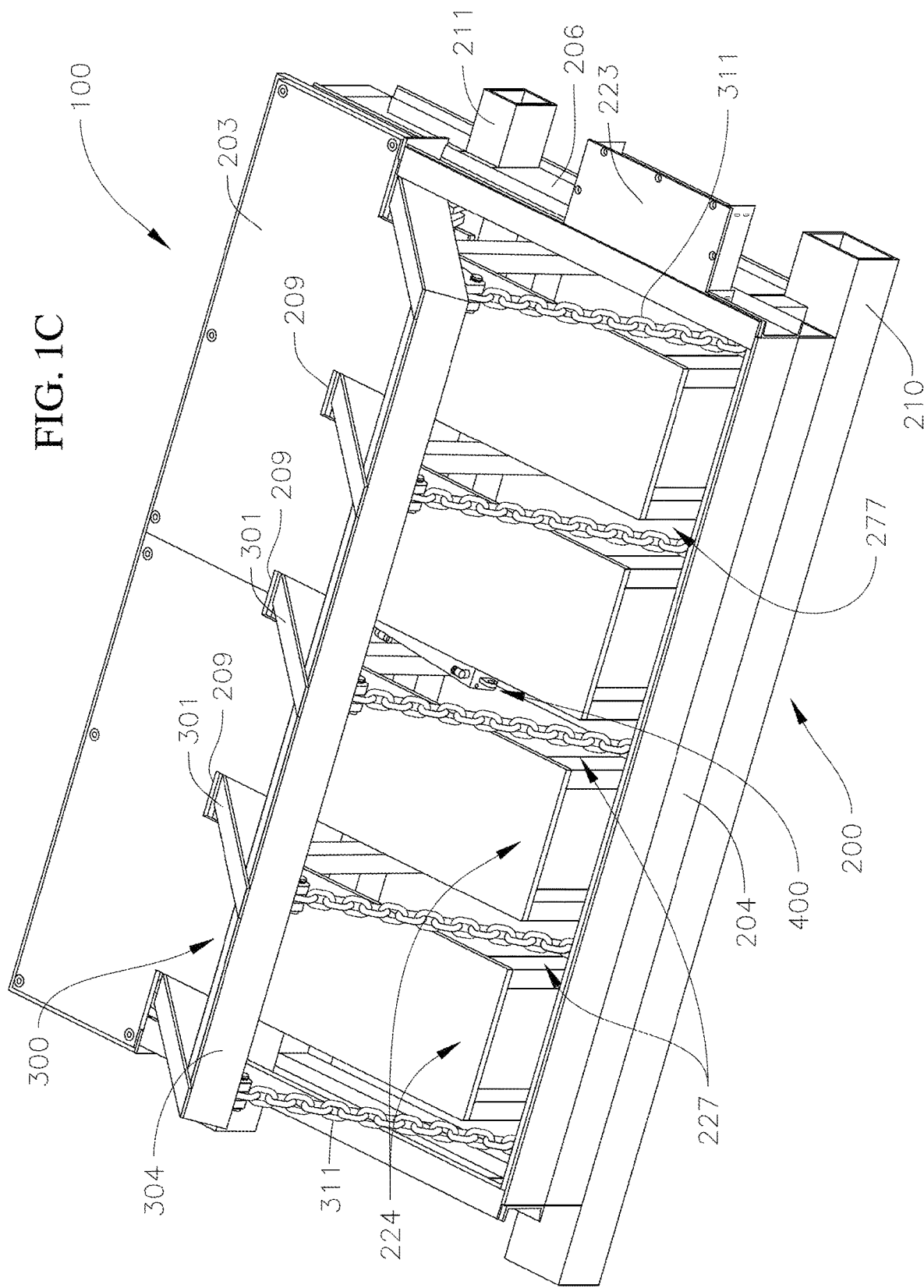
Figure 1E:
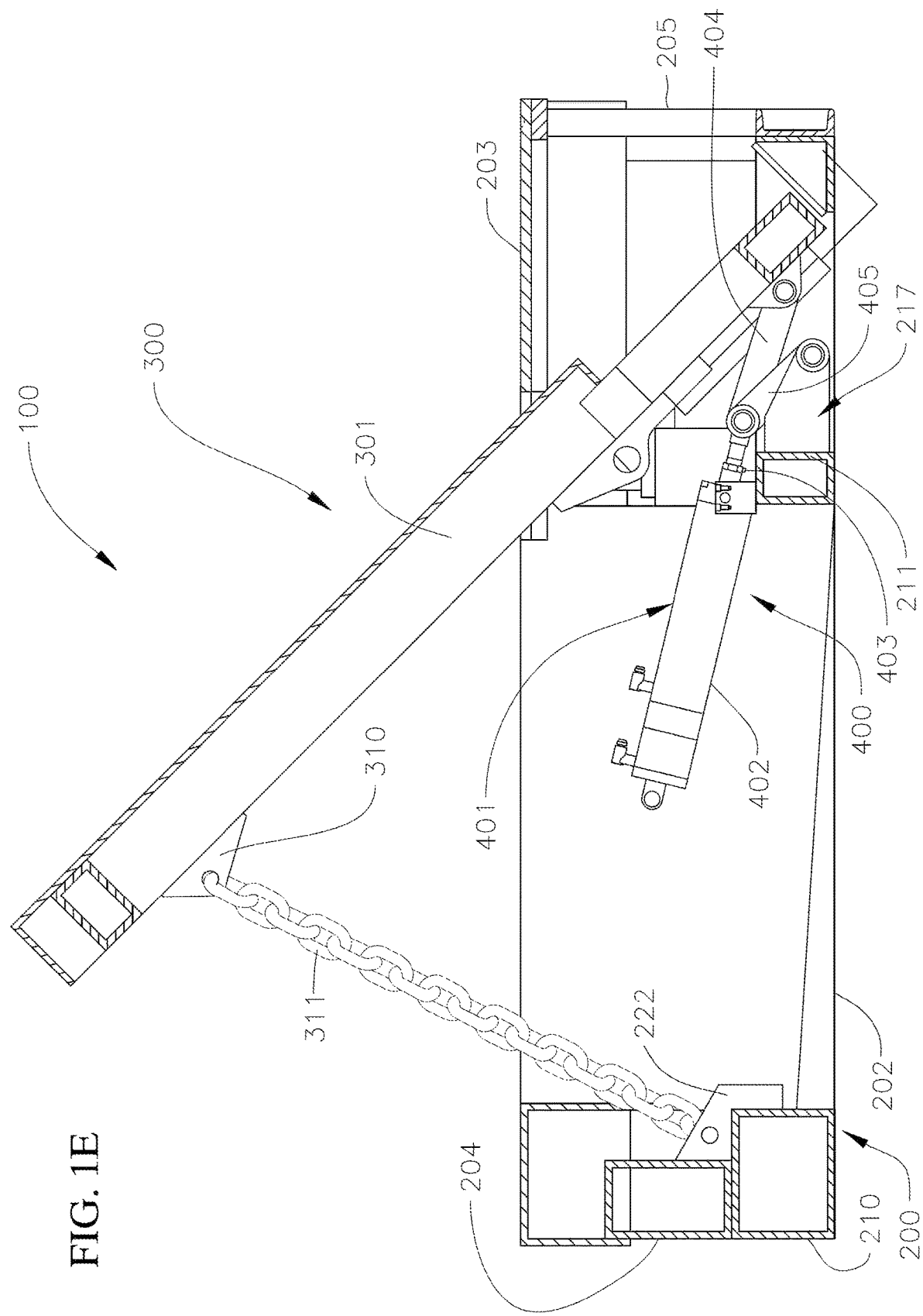
Figure 1F:
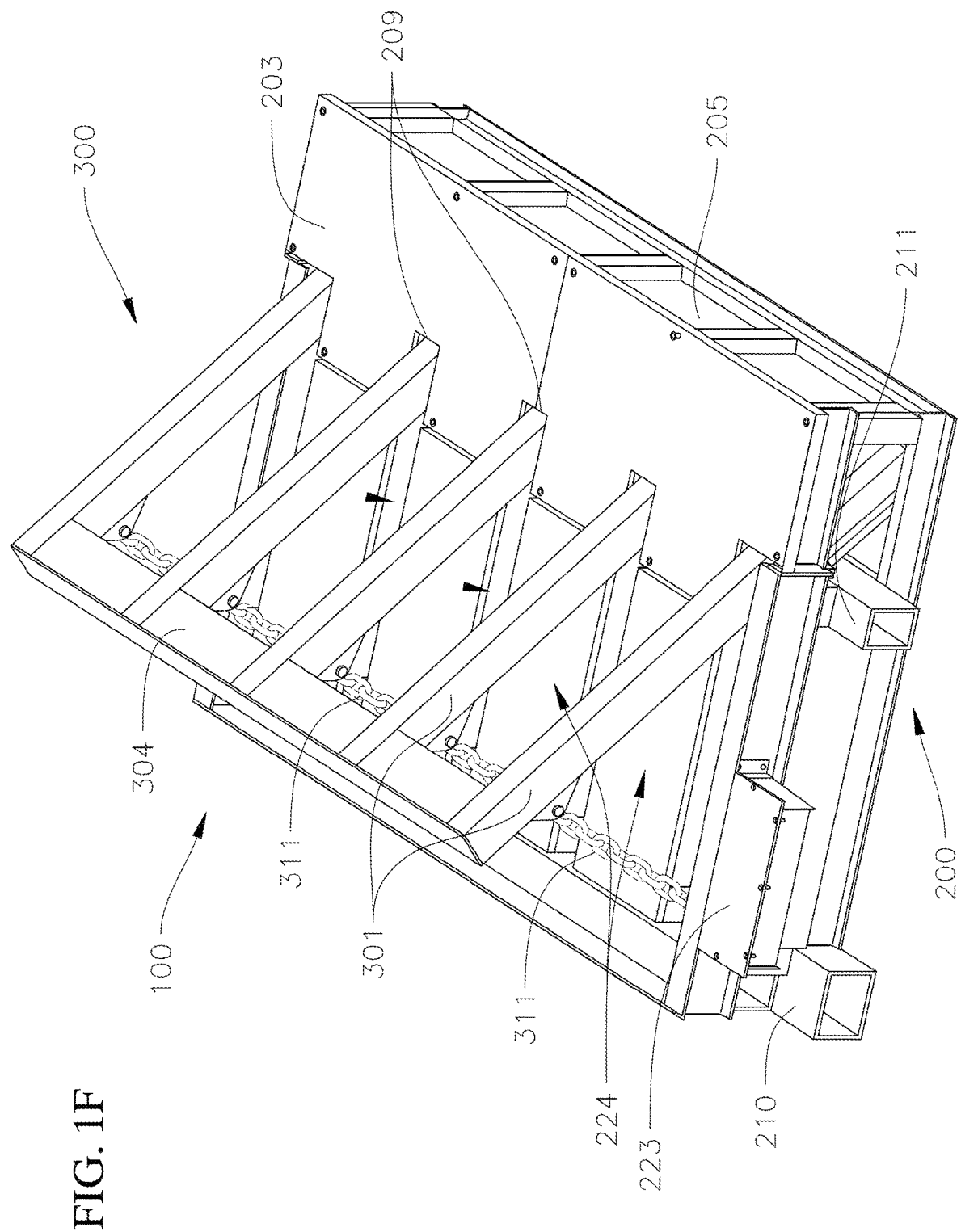
Figure 1G:
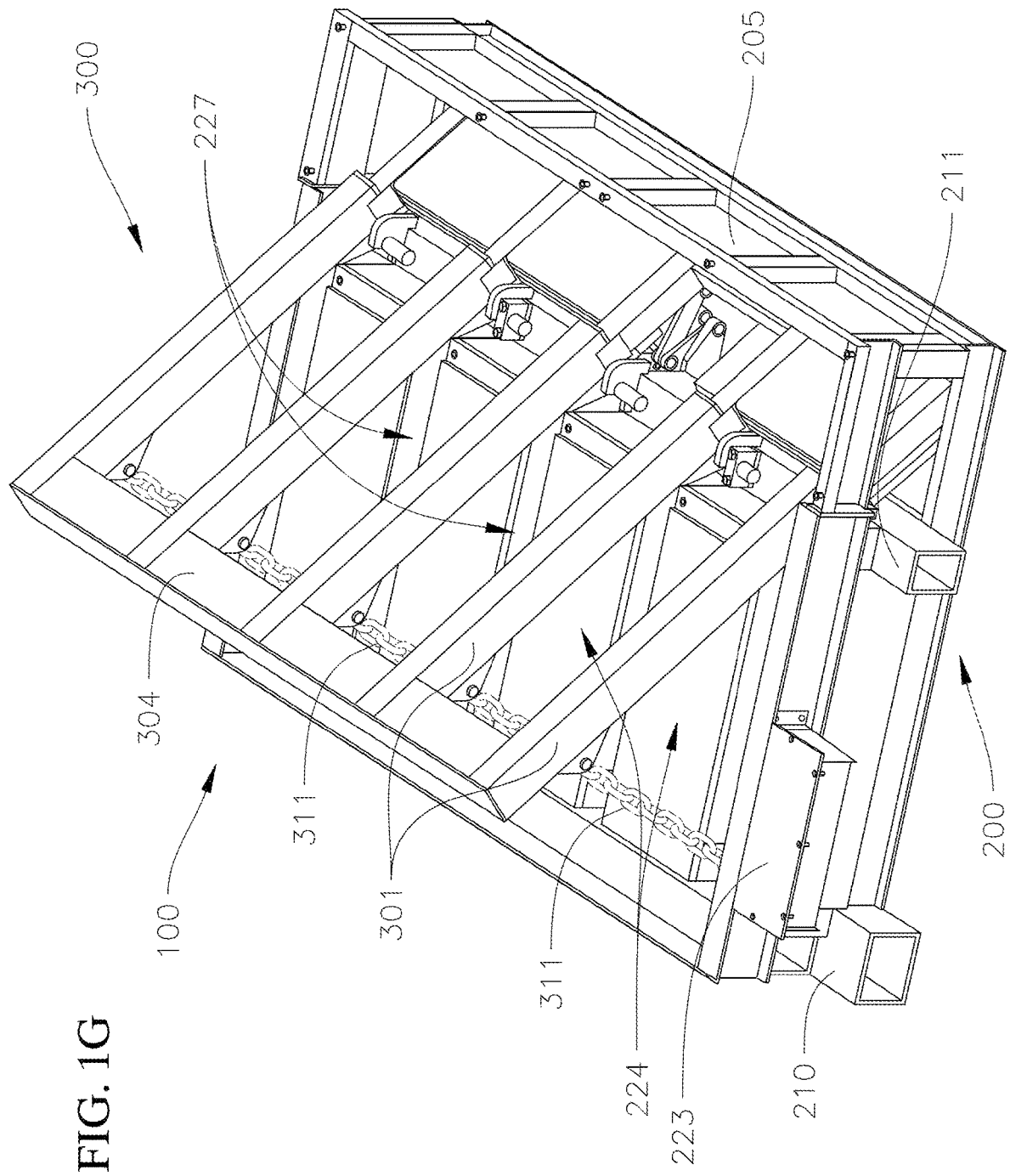
Figure 2A:
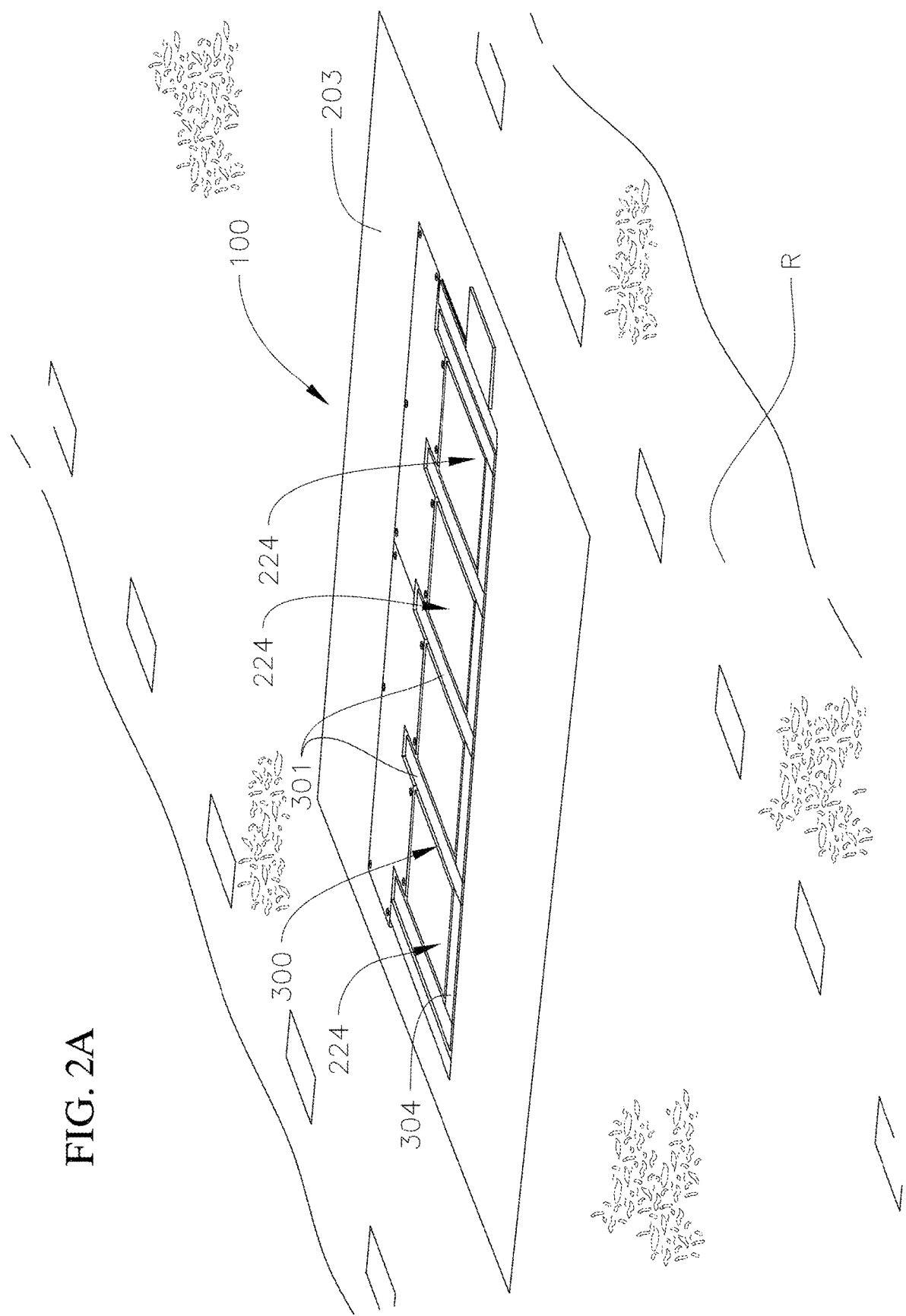
FIG. 2A is a perspective view of the barricade including the foundation frame, the finger wedge barrier, and the actuator mechanism according to the embodiment illustrated in FIG. 1A in a stowed configuration and installed in the roadway.
Figure 2B:
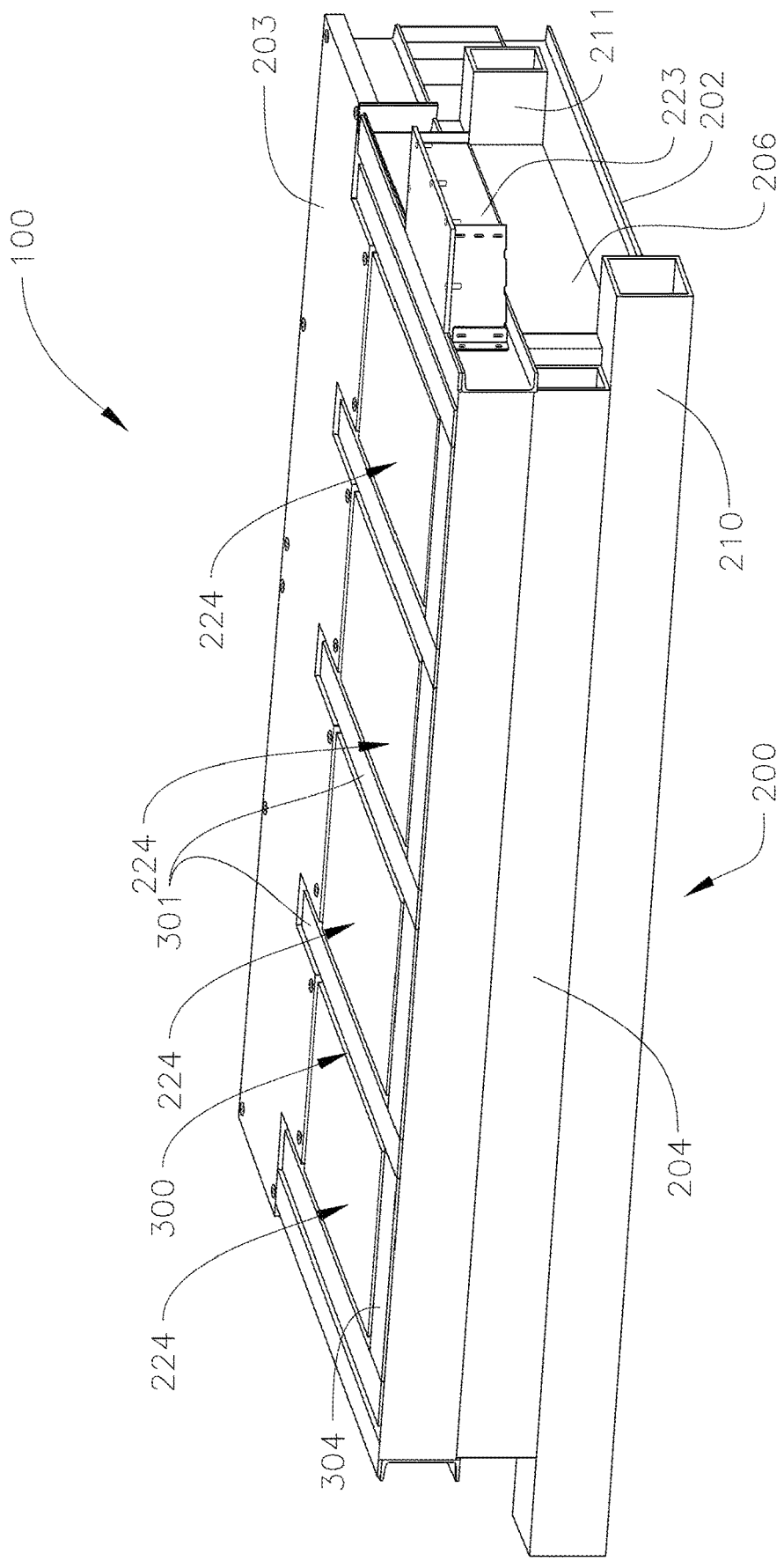
FIGS. 2B-2G are a front perspective view, a top-down perspective view, a front view, and a side cross-sectional view, and first and second rear perspective views, respectively, of the barricade including the foundation frame, the finger wedge barrier, and the actuator mechanism according to the embodiment illustrated in FIG. 2A in the stowed configuration.
Figure 2C:
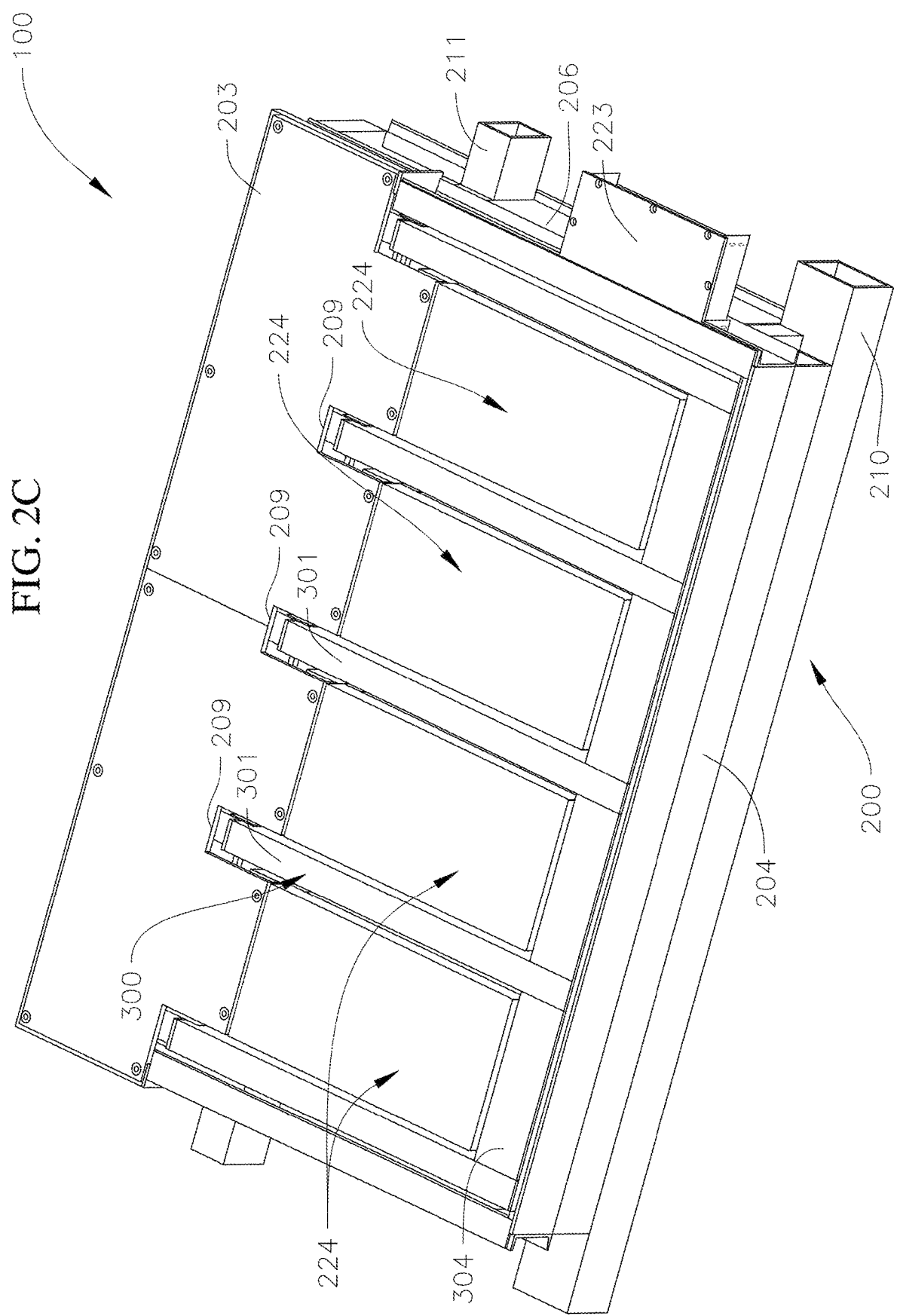
Figure 2D:
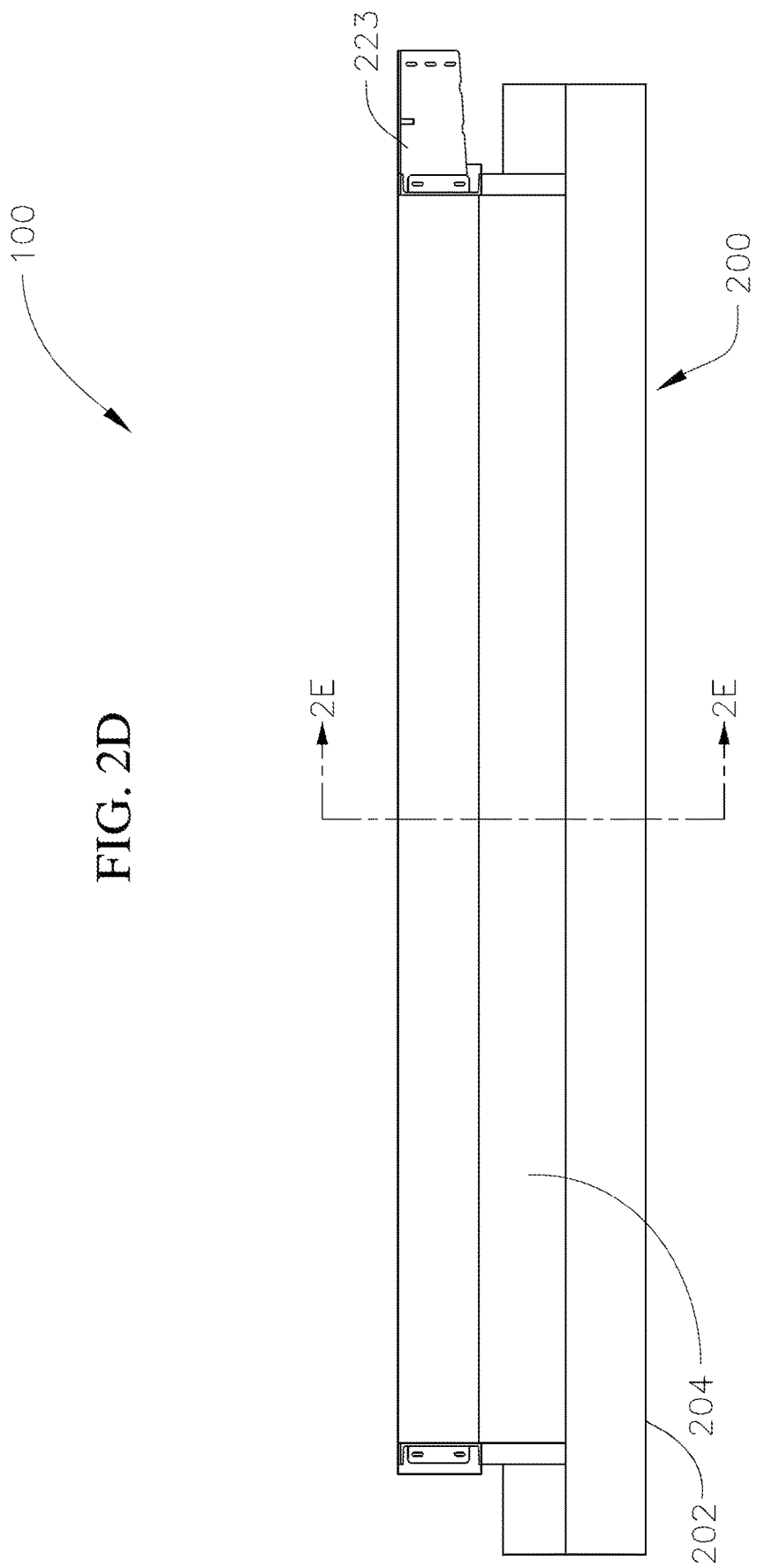
Figure 2E:
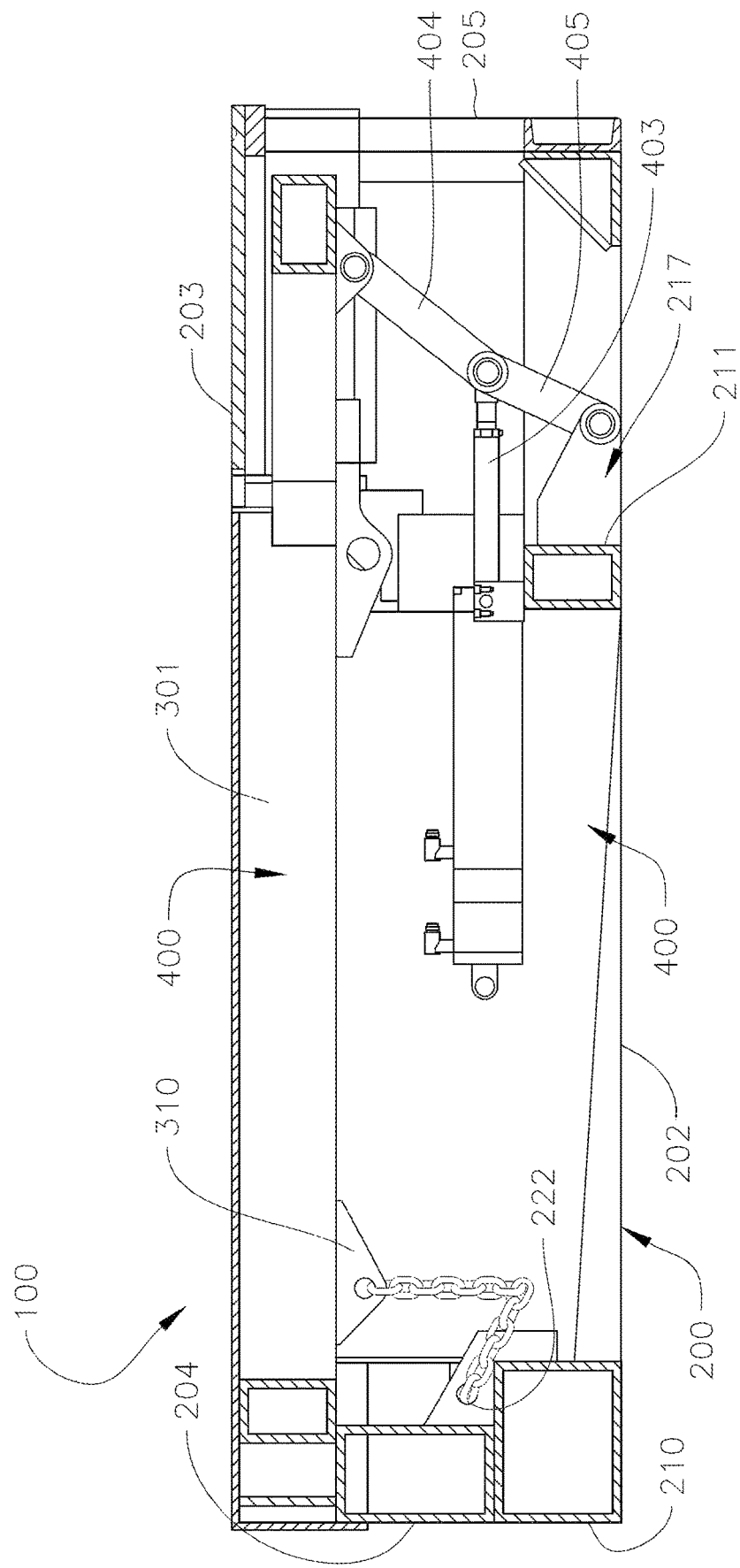
Figure 2F:
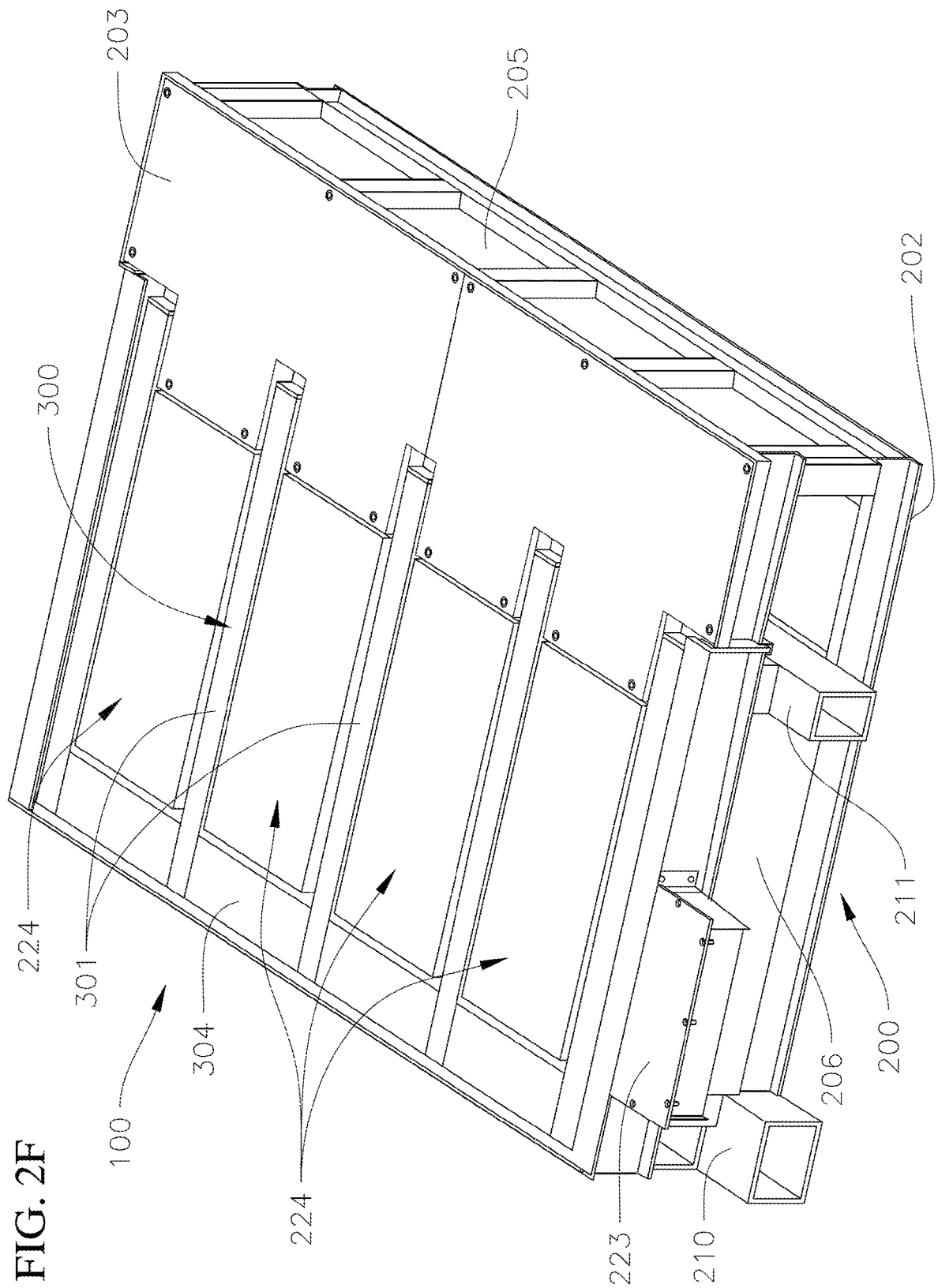
Figure 2G:
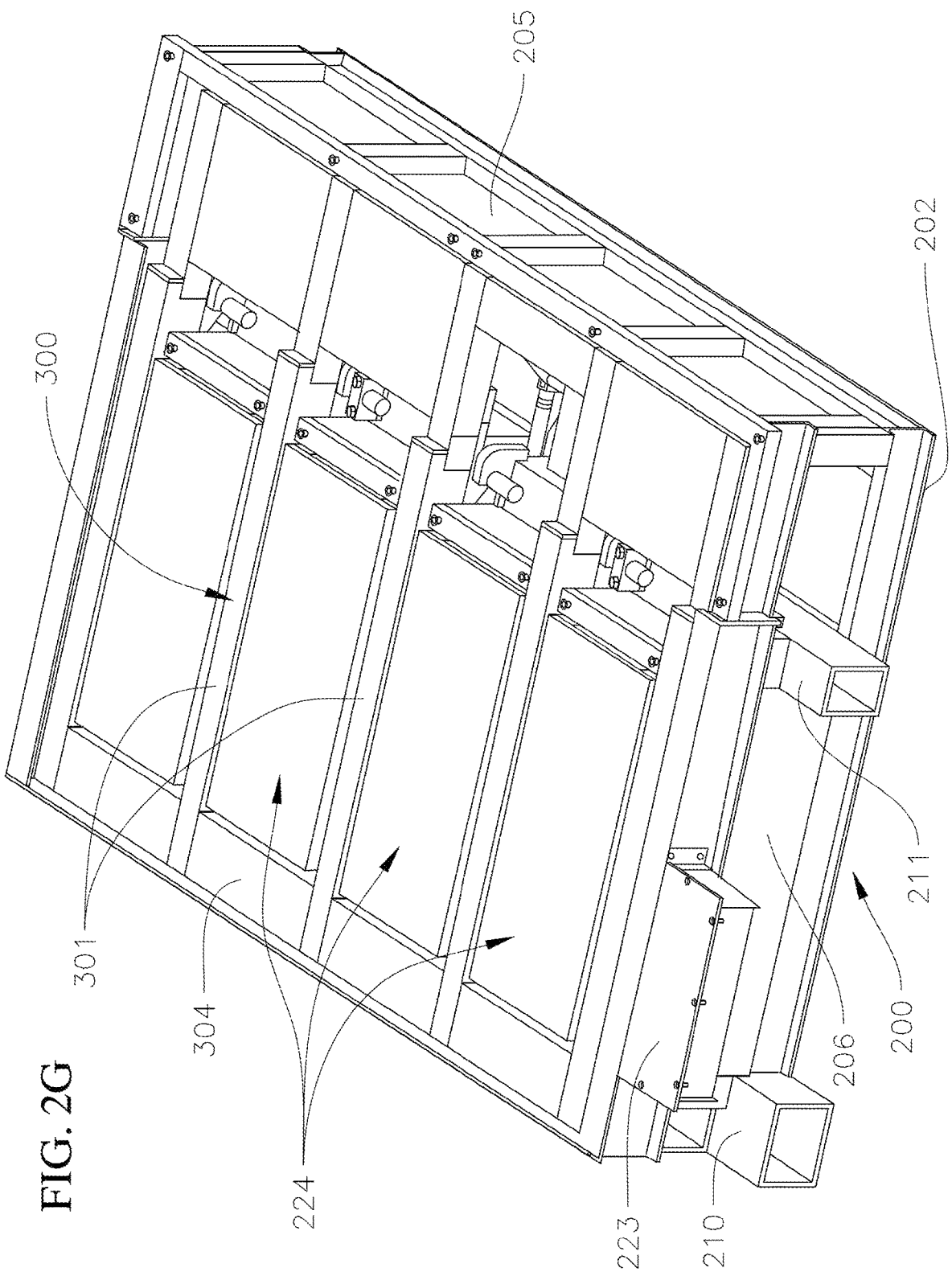

The present disclosure relates to various embodiments of a mechanism for actuating a barricade between a stowed configuration and a deployed configuration, and various embodiments of a barricade including an actuator mechanism configured to actuate the barricade between a stowed configuration and a deployed configuration. In the stowed configuration (i.e., a road open position), a vehicle is capable of passing over the barricade, and in the deployed configuration (i.e., a road closed position), the barricade is configured to prevent a vehicle from passing over the barricade. In this manner, the barricade is configured to selectively prevent passage of a vehicle over a roadway and/or to protect a building or other structure from an attacking vehicle. The barricade includes a fixed component and a rotatable component that is configured to rotate relative to the fixed component between the stowed configuration and the deployed configuration. The barricade may be any suitable type or kind of barricade configured to move between a stowed configuration and a deployed configuration, such as, for example, a finger wedge type barricade (i.e., a turpin barricade).

The actuator mechanism according to various embodiments of the present disclosure includes an actuator (e.g., a hydraulic, pneumatic, or electromechanical actuator) and a linkage between the actuator and the rotatable component of the barricade. Providing a linkage between the actuator and the rotatable component of the barricade is configured to increase the mechanical advantage of the actuator mechanism, and thereby increase the speed at which the actuator is configured to accelerate the rotatable component into the deployed configuration and/or reduce the force required to be imparted by the actuator to begin moving the rotatable component into the deployed configuration, compared to a conventional barricade in which the actuator is directly coupled to the rotatable component. Additionally, the linkage between the actuator and the rotatable component of the barricade is configured to attenuate shocks imparted by a vehicle passing over the barricade in the stowed configuration and thereby isolate or at least mitigate against the transmission of shocks to the actuator. Attenuating the shocks imparted to the actuator is configured to reduce the wear on the actuator and the brake of the actuator compared to a conventional mechanism in which the actuator is directly coupled to the rotatable component of the barricade.

With reference now to FIGS. 1A-2G, a barricade 100 according to one embodiment of the present disclosure includes a base or foundation frame 200, a finger wedge barrier 300 hingedly coupled to the foundation frame 200 and configured to rotate relative to the foundation frame 200 between a stowed configuration (shown in FIGS. 2A-2G) and a deployed configuration (shown in FIGS. 1A-1G), and an actuator mechanism 400 configured to rotate the finger wedge barrier 300 between the stowed and deployed configurations. When the barricade 100 is installed, the foundation frame 200 may be recessed (i.e., buried) in a trench excavated in a roadway R. In the stowed position, the finger wedge barrier 300 does not extend above an upper surface of the roadway R (e.g., the finger wedge barrier 300 is flush or substantially flush with an upper surface of the roadway R, or the finger wedge barrier 300 is recessed below the upper surface of the roadway R) such that vehicles are capable of driving over the barricade 100 in the stowed configuration. In the deployed position, at least a portion of the finger wedge barrier 300 extends above the upper surface of the roadway R and is therefore configured to prevent vehicles from passing over the barricade 100 and, for example, attacking a building or other structure. Accordingly, in the illustrated embodiment, the foundation frame 200 is a fixed or static component and the finger wedge barrier 300 is a movable component configured to move between a stowed configuration in which the roadway R is open to traffic and a deployed position in which the roadway R is closed to traffic. Although in the illustrated embodiment the barricade 100 is a finger wedge type barricade (i.e., a turpin barricade), in one or more embodiments the barricade 100 may be any other suitable type or kind of barricade configured to move between a stowed configuration and a deployed configuration (i.e., the actuator mechanism 400 may be utilized to move the moveable component of any suitable type or kind of barricade between a stowed configuration and a deployed configuration).

Figure 3A:
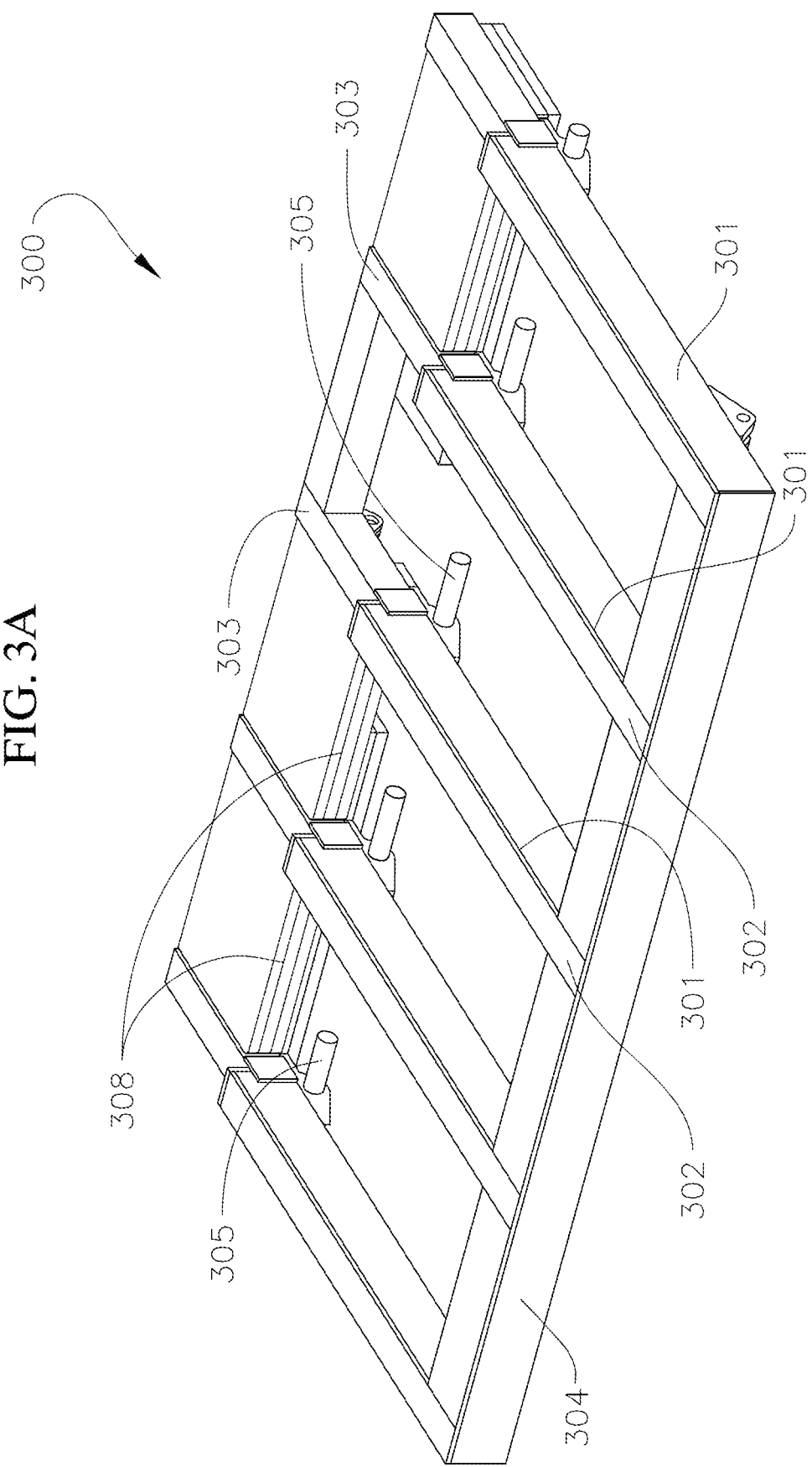
FIGS. 3A-3B are a top-down perspective view and a bottom-up perspective view, respectively, of the finger wedge barrier according to one embodiment of the present disclosure.
Figure 3B:
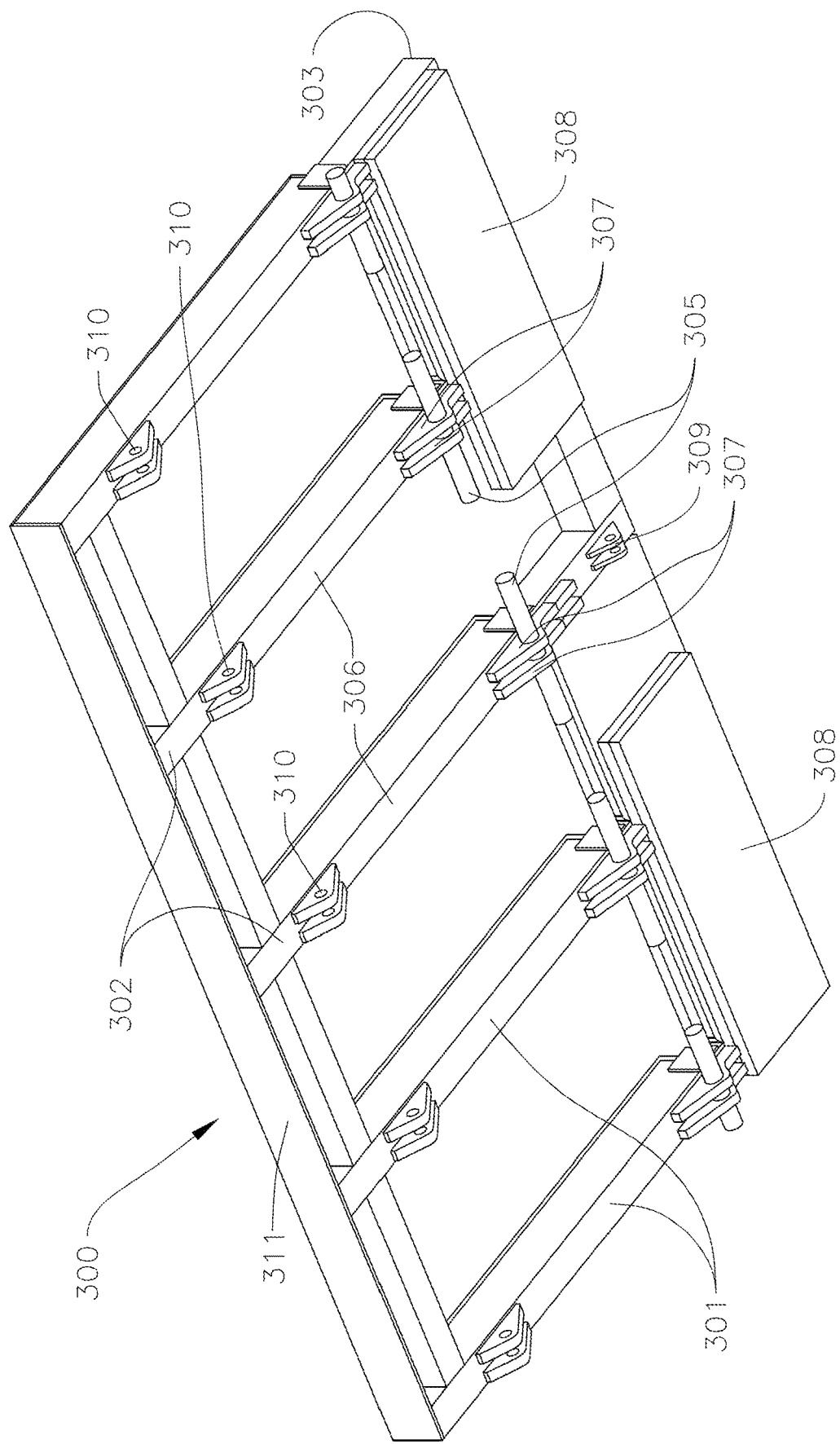

With reference now to the embodiment illustrated in FIGS. 3A-3B, the finger wedge barrier 300 includes a series of longitudinally extending support members 301 (i.e., finger members) each having a front end 302 and a rear end 303 opposite the front end 302. The longitudinally extending support members 301 are laterally spaced apart from each other. The finger wedge barrier 300 also includes a blocking member 304 extending transversely and coupled to and interconnecting the front ends 302 of the support members 301. Additionally, in the illustrated embodiment, the finger wedge barrier 300 includes a series of hinge pins 305 coupled to the support members 301. In the illustrated embodiment, each hinge pin 305 is coupled to one of the support members 301 at an intermediate position along the length of the support member 301 between the front end 302 and the rear end 303. Additionally, in the illustrated embodiment, the hinge pins 305 are biased toward the rear ends 303 of the support members 301 (i.e., the hinge pins 305 are closer to the rear ends 303 than the front ends 302 of the support members 301). Although in the illustrated embodiment the finger wedge barrier 300 includes a hinge pin 305 coupled to each of the support members 301 (e.g., the number of hinge pins 305 is equal to a number of the support members 301), in one or more embodiments, fewer than all of the support members 301 may include a hinge pin 305 (e.g., the finger wedge barrier 300 may include a number of hinge pins 305 that is less than a number of the support members 301). In the illustrated embodiment, each hinge pin 305 is coupled to a lower surface 306 of one of the support members 301 with a pair of hinge pin brackets 307.

In the illustrated embodiment, the finger wedge barrier 300 also includes one or more counter weights 308 coupled to the rear end 303 of at least one of the support members 301 to aid in rotation of the finger wedge barrier 300 between the stowed configuration and the deployed configuration.

In the illustrated embodiment, the finger wedge barrier 300 also includes an actuator attachment clevis 309 coupled to the lower surface 306 of one of the support members 301. As described in more detail below, the actuator attachment clevis 309 is coupled to the actuator mechanism 400. In the illustrated embodiment, the actuator attachment clevis 309 is coupled to a middle one of the support members 301 (i.e., the support member 301 that is laterally centered along the width of the finger wedge barrier 300), although in one or more embodiments the actuator attachment clevis 309 may be coupled to any of the other support members 301. Although in the illustrated embodiment the finger wedge barrier 300 includes a single actuator attachment clevis 309 corresponding to the single actuator mechanism 400, in one or more embodiments the finger wedge barrier 300 may include any number of actuator attachment clevises 309 depending on the number of actuator mechanisms 400 (i.e., the finger wedge barrier 300 may have a number of actuator attachment clevises 309 corresponding to the number of actuator mechanisms 400). In one or more embodiments, the number of actuator attachment clevises 309 may differ from the number of actuator mechanisms 400 (e.g., two or more actuator mechanisms 400 may be coupled to a single actuator attachment clevis 309). Additionally, in the illustrated embodiment, the actuator attachment clevis 309 is coupled to a rear portion of the support member between the clevis pin 305 and the rear end 303 of the support member 301 (e.g., the actuator attachment clevis 309 is coupled to the support member 301 proximate to the rear end of the support member 301 spaced rearward from the clevis pin 305). Spacing the actuator attachment clevis 309 rearward from the hinge pin 305 is configured to increase the mechanical advantage of the actuator mechanism 400 compared to an otherwise equivalent barrier in which the actuator attachment clevis 309 is more closely spaced from the hinge pin 305. In one or more embodiments, the finger wedge barrier 300 may include any other suitable structure for coupling the actuator mechanism 400 to the finger wedge barrier 300.

In the illustrated embodiment, the finger wedge barrier 300 also includes a series of retention clevises 310 coupled to the support members 301. In the illustrated embodiment, each retention clevis 310 is coupled to one of the support members 301 proximate to the front end 302 of the support member 301. Although in the illustrated embodiment the finger wedge barrier 300 includes a retention clevis 310 coupled to each of the support members 301 (e.g., the number of retention clevises 310 is equal to a number of the support members 301), in one or more embodiments, fewer than all of the support members 301 may include a retention clevis 310 (e.g., the finger wedge barrier 300 may include a number of retention clevises 310 that is less than a number of the support members 301). As described in more detail below, each of the retention clevises 310 is coupled to an upper end of a retention member 311 (e.g., a chain or cable) (see FIGS. 1B-1E), and a lower end of each of the retention members 311 is coupled to the foundation frame 200. When the finger wedge barrier 300 is in the deployed position, the retention members 311 are configured to prevent over-rotation of the finger wedge barrier 300 relative to the foundation frame 200 during a vehicle collision, which might otherwise enable a vehicle to pass the barricade 100.

Figure 4A:
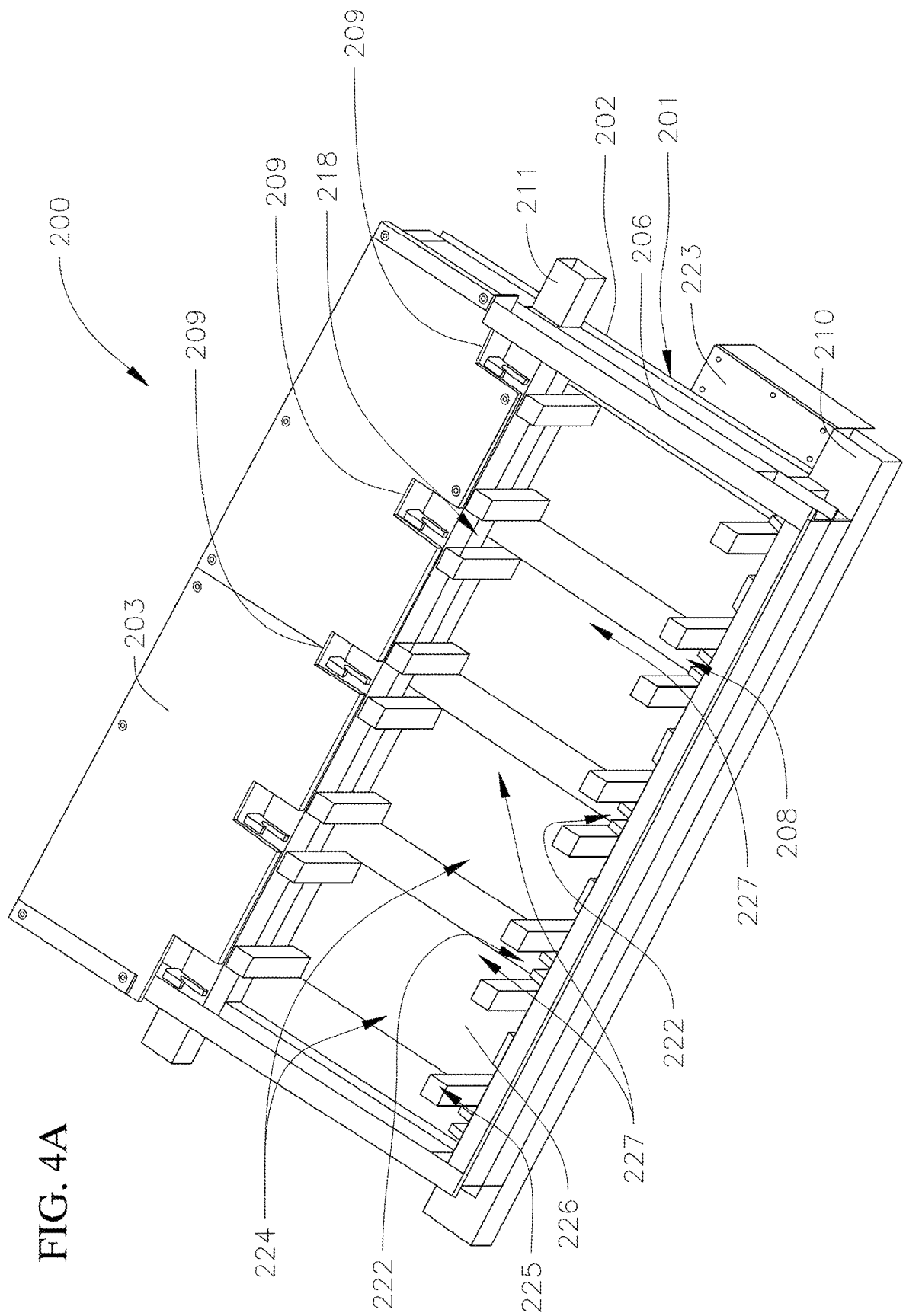
FIGS. 4A-4B are a front perspective view and a rear perspective view, respectively, of the foundation frame according to one embodiment of the present disclosure.
Figure 4B:
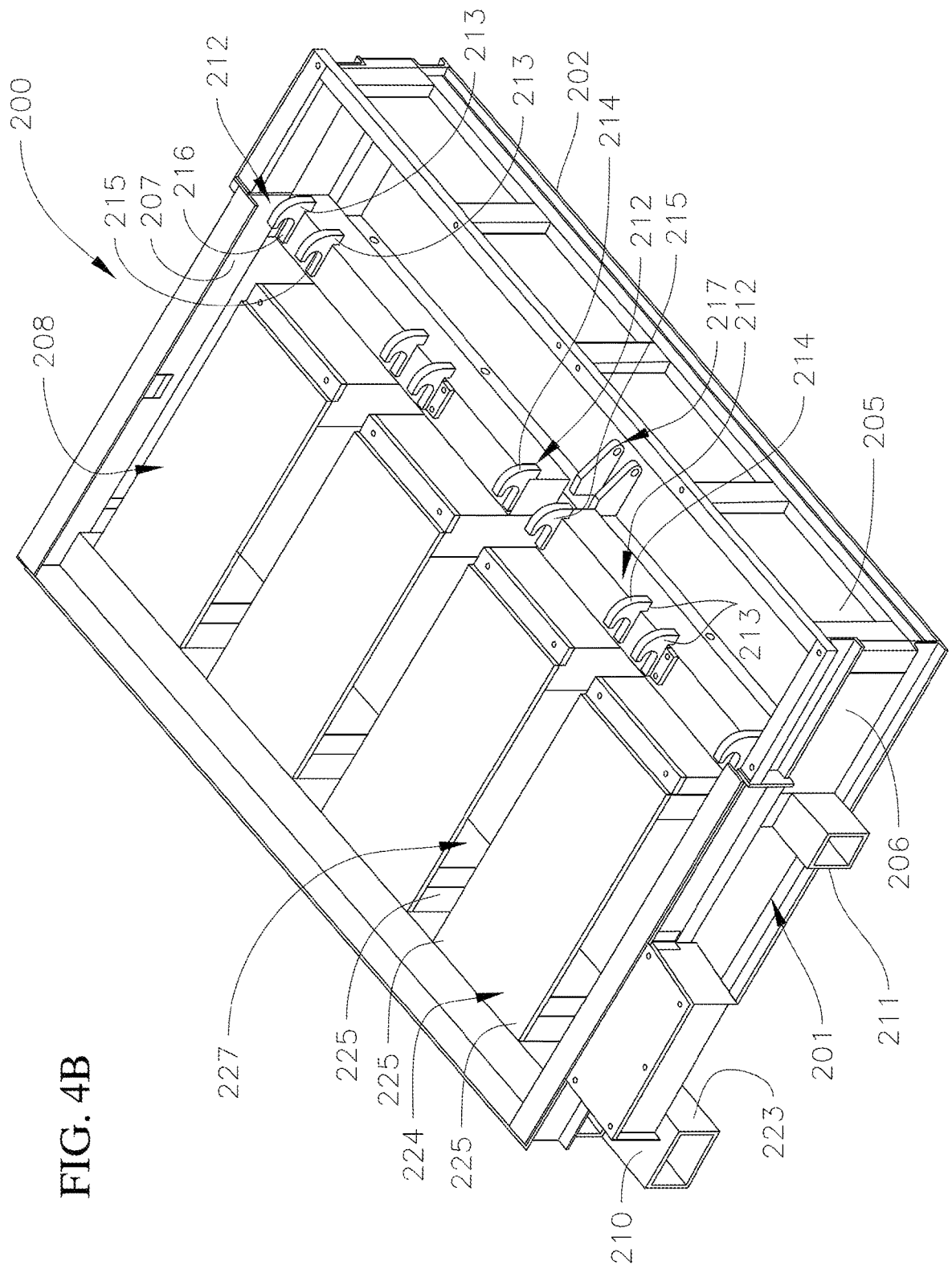

With reference now to the embodiment illustrated in FIGS. 4A-4B, the foundation frame 200 includes a box frame 201 including a lower wall 202, an upper wall 203 (shown in FIG. 4A and omitted in FIG. 4B to reveal other components) opposite the lower wall 202, a front wall 204, a rear wall 205 opposite the front wall 204, and a pair of opposing sidewalls 206, 207. Together, the lower wall 202, the upper wall 203, the front wall 204, the rear wall 205, and the sidewalls 206, 207 define an interior space 208. In the illustrated embodiment, the upper wall 203 includes a series of slots 209 configured to accommodate portions of the support members 301 of the finger wedge barrier 300 as the finger wedge barrier 300 rotates into the deployed configuration.

Additionally, in the illustrated embodiment, the foundation frame 200 includes a series of transverse structural members (e.g., box beams). In the illustrated embodiment, the box frame 201 of the foundation frame 200 includes a first transverse member 210 (e.g., a first box beam) proximate to the front wall 204 and a second transverse member 211 (e.g., a second box beam) at an intermediate position between the front wall 204 and the rear wall 205. In the illustrated embodiment, the second transverse member 211 is aligned or substantially aligned with the hinge pins 305 of the finger wedge barrier 300.

In the illustrated embodiment, the foundation frame 200 also includes a series of hinge pin receptacles 212 coupled to the second transverse member 211 and housed in the interior space 208 of the box frame 201. The hinge pin receptacles 212 are configured to rotatably support the hinge pins 305 of the finger wedge barrier 300. Together, the hinge pins 305 and the hinge pin receptacles 212 define a hinge about which the finger wedge barrier 300 is configured to rotate relative to the foundation frame 200 between the stowed and deployed configurations. In the illustrated embodiment, each of the hinge pin receptacles 212 includes a pair of brackets 213, 214 spaced laterally apart along the length of the second transverse member 211. Additionally, in the illustrated embodiment, each of the brackets 213, 214 includes a slot 215, 216, respectively, that is open at its front end. The slot 215 in the bracket 213 is configured to rotatably support one side of one of the hinge pins 305 and the slot 216 in the bracket 214 is configured to rotatably support the other side of the hinge pin 305. In the illustrated embodiments, the configuration of the brackets 213, 214 are identical, although in one or more embodiments the configuration of the brackets 213, 214 may be different than each other. Although in the illustrated embodiment the foundation frame 200 includes the hinge pin receptacles 212 and the finger wedge barrier 300 includes the hinge pins 305, in one or more embodiments, the foundation frame 200 may include the hinge pins 305 and the finger wedge barrier 300 may include the hinge pin receptacles 212.

In the illustrated embodiment, the foundation frame 200 also includes an actuator attachment clevis 217 coupled to the second transverse member 211 and housed in the interior space 208 of the box frame 201. As described in more detail below, the actuator mechanism 400 is coupled to the actuator attachment clevis 217. In the illustrated embodiment, the actuator attachment clevis 217 is laterally aligned with the actuator attachment clevis 309 of the finger wedge barrier 300 (e.g., the actuator attachment clevis 217 is laterally centered along the length of the second transverse member 211). Although in the illustrated embodiment the foundation frame 200 includes a single actuator attachment clevis 217 corresponding to the single actuator mechanism 400, in one or more embodiments the foundation frame 200 may include any number of actuator attachment clevises 217 depending on the number of actuator mechanisms 400 (i.e., the foundation frame 200 may have a number of actuator attachment clevises 217 corresponding to the number of actuator mechanisms 400). In one or more embodiments, the number of actuator attachment clevises 217 may differ from the number of actuator mechanisms 400 (e.g., two or more actuator mechanisms 400 may be coupled to a single actuator attachment clevis 217).

In the illustrated embodiment, the foundation frame 200 also includes an actuator support member 218 (see also FIGS. 5A-5B) coupled to the second transverse member 211. As described in more detail below, the actuator support member 218 is configured to enable the actuator mechanism 400 to rotate relative to the foundation frame 200. In the illustrated embodiment, the actuator support member 218 is laterally aligned or substantially laterally aligned with the actuator attachment clevis 217. In the illustrated embodiment, the actuator support member 218 includes a pair of spaced apart brackets 219, 220, and each bracket 219, 220 defines an opening 221 (e.g., a hole) aligned with the opening 221 in the other bracket 219, 220.

In the illustrated embodiment, the foundation frame 200 also includes a series of retention clevises 222 coupled to the first transverse member 210. The retention clevises 222 are coupled to the lower ends of the retention members 311 (e.g., the chains or cables). In the illustrated embodiment, the number of retention clevises 222 of the foundation frame 200 is equal to the number of retention clevises 310 of the finger wedge barrier 300, and the retention clevises 222 of the foundation frame 200 are laterally aligned or substantially laterally aligned with the retention clevises 310 of the finger wedge barrier 300. In this manner, opposite ends of the retention members 311 are coupled to the finger wedge barrier 300 and the foundation frame 200. When the finger wedge barrier 300 is in the deployed position, the retention members 311 are configured to prevent over-rotation of the finger wedge barrier 300 relative to the foundation frame 200 during a vehicle collision, which might otherwise enable a vehicle to pass the barricade 100 (i.e., the retention members 311 are configured to hold the finger wedge barrier 300 in place during a vehicle impact).

In the illustrated embodiment, the foundation frame 200 also includes an access box 223 (e.g., a junction box) through which power supply lines (e.g., electrical lines from a power supply, such as at least one battery) and electrical lines configured to control the actuation of the actuator mechanism 400 (e.g., electrical wiring from a controller, a processor, and/or a microcontroller) are connected to the barricade 100. In the illustrated embodiment, the barricade 100 includes a single access box 223 coupled to an outer surface of one of the sidewalls 206 of the box frame 201, although in one or more embodiments the barricade 100 may include two or more access boxes 223. In an embodiment in which the actuator mechanism 400 includes a hydraulic actuator, hydraulic lines connected to a hydraulic reservoir and a pump configured to supply hydraulic fluid from the hydraulic reservoir to the hydraulic actuator may be connected to the access box 223.

In the illustrated embodiment, the foundation frame 200 also includes a series of road-plate assemblies 224 in the interior space 208. In the illustrated embodiment, each of the road-plate assemblies 224 includes a series of posts 225 and a road-plate 226 coupled to upper ends of the posts 225. Together, the posts 225 and the road-plate 226 of each road-plate assembly 224 are arranged in a box-like configuration. In one or more embodiments, the road-plate assemblies 224 may have any other suitable configuration (e.g., the road-plate assemblies 224 may include concrete and rebar blocks). Adjacent road-plate assemblies 224 are laterally spaced apart from each other by a space 227 having a width equal to or greater than the width of the support members 301 of the finger wedge barrier 300. In one or more embodiments, the weight of the road-plate assemblies 224 is configured to anchor the foundation frame 200 in the roadway R and resist rotation of the barricade 100 if the finger wedge barrier 300 is struck by a vehicle. The spaces 227 between the road-plate assemblies 224 accommodate the support members 301 of the finger wedge barrier 300 when the finger wedge barrier 300 is in the stowed configuration.

In the illustrated embodiments, the actuator mechanism 400 is laterally centered or substantially laterally centered in the foundation frame 200 and the actuator mechanism 400 is located in the space 227 between two adjacent road-plate assemblies 224. In one or more embodiments, the actuator mechanism 400 may be located in any other suitable position. For instance, in one or more embodiments, the barricade 100 may include two actuator mechanisms 400 that are located at laterally opposed sides of the foundation frame 200.

Figure 5A:
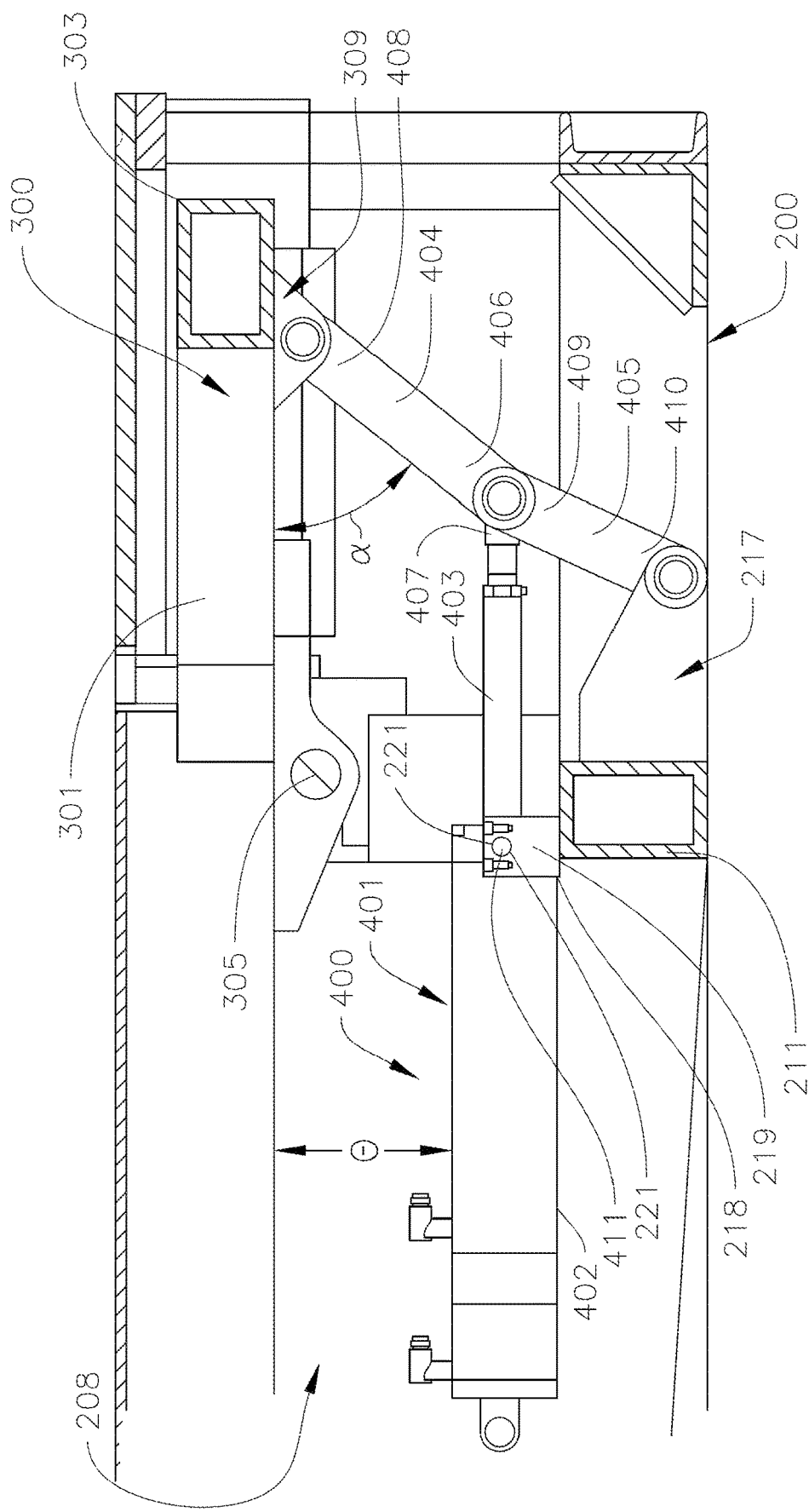
FIGS. 5A-5B are detail side views of the actuator mechanism according to one embodiment of the present disclosure in the stowed configuration and the deployed configuration, respectively.
Figure 5B:
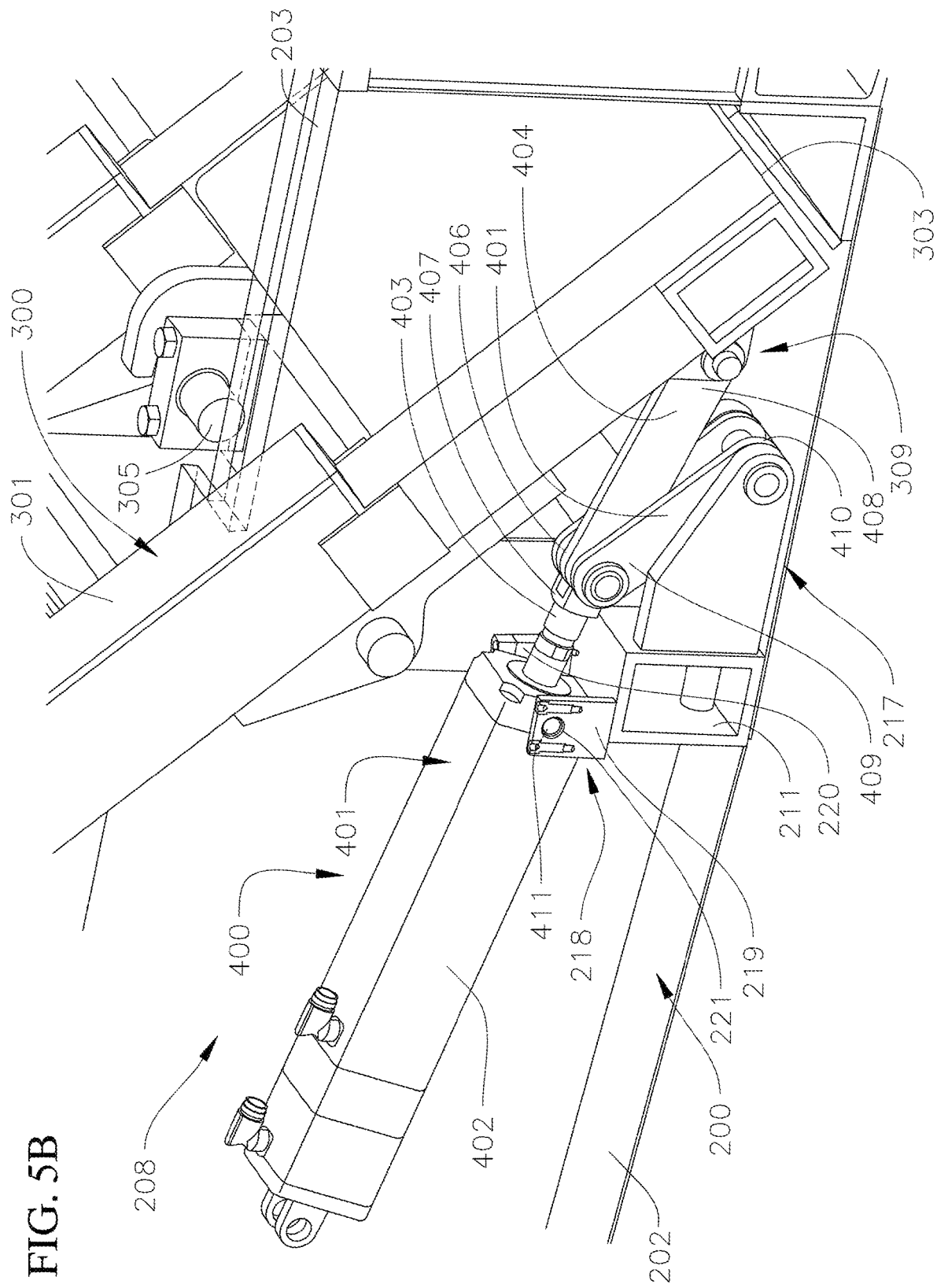

With reference now to the embodiment illustrated in FIGS. 5A-5B, the actuator mechanism 400 includes a linear actuator 401 having a housing or a body 402 and a rod 403 configured to reciprocally move within an interior of the housing 402 between an extended position and a retracted position along its stroke. The linear actuator 401 may be any suitable type or kind of actuator, such as, for example, a hydraulic actuator or an electromechanical actuator. In the illustrated embodiment, the actuator mechanism 400 also includes a first linkage 404 coupled to the finger wedge barrier 300, and a second linkage 405 coupled to the foundation frame 200. The first linkage 404 includes a first end 406 rotatably coupled to a rod end 407 of the rod 403, and a second end 408 rotatably coupled to the actuator attachment clevises 309 of the finger wedge barrier 300. The second linkage 405 includes a first end 409 rotatably coupled to the rod end 407 of the rod 403, and a second end 410 rotatably coupled to the actuator attachment clevis 217 of the foundation frame 200. Although in the illustrated embodiment the first linkage 404 is an elongated flat plate, in one or more embodiments the first linkage 404 may have any other suitable configuration, such as, for example, a pair of elongated flat plates, one or more rods, and/or one or more brackets. Additionally, although in the illustrated embodiment the second linkage 405 includes a pair of elongated flat plates, in one or more embodiments the second linkage 405 may have any other suitable configuration, such as, for example, a single elongated flat plate, one or more rods, and/or one or more brackets. Furthermore, in the illustrated embodiment, the length of the first linkage 404 is longer than the length of the second linkage 405 (i.e., the distance between the first end 406 and the second end 408 of the first linkage 404 is greater than the distance between the first end 409 and the second end 410 of the second linkage 405).

In the illustrated embodiment, the first linkage 404 is coupled to a rear end portion of the finger wedge barrier 300 between the hinge (i.e., the hinge pins 305 and the hinge pin receptacles 212) and the rearmost ends 303 of the longitudinally extending support members 301 of the finger wedge barrier 300. That is, the attachment point between the first linkage 404 and the finger wedge barrier 300 is spaced rearward of the hinge between the finger wedge barrier 300 and the foundation frame 200. Accordingly, in the illustrated embodiment, the first linkage is 404 coupled to a portion of the finger wedge barrier 300 that rotates downward and remains inside the interior space 208 of the foundation frame 200 as the finger wedge barrier 300 rotates into the deployed position. Spacing the attachment point between the first linkage 404 and the finger wedge barrier 300 rearward from the hinge is configured to increase the mechanical advantage of the actuator mechanism 400 compared to an otherwise equivalent barrier in which the attachment point is more closely spaced from the hinge.

Additionally, in the illustrated embodiment, the angle α between the finger wedge barrier 300 and the first linkage 404 is greater than the angle θ between the finger wedge barrier 300 and the actuator 401. In the illustrated embodiment, when the finger wedge barrier 300 is in the stowed configuration (shown in FIG. 5A), the angle θ between the finger wedge barrier 300 and the actuator 401 is zero or approximately zero (i.e., the actuator 401 is parallel or substantially parallel to the finger wedge barrier 300 when the finger wedge barrier 300 is in the stowed configuration), and the angle α between the finger wedge barrier 300 and the first linkage 404 is in a range from approximately 30 degrees to approximately 60 degrees. In one embodiment, when the finger wedge barrier 300 is in the stowed configuration, the angle α between the finger wedge barrier 300 and the first linkage 404 is approximately 45 degrees. The greater angle α between the finger wedge barrier 300 and the first linkage 404 increases the mechanical advantage of the actuator mechanism 400 and increases the torque supplied from the actuator 401 to the finger wedge barrier 300 compared to an embodiment in which the actuator 401 is directly coupled to the finger wedge barrier 300 and the actuator 401 is oriented at a small angle relative to the finger wedge barrier 300. The relatively high mechanical advantage at the beginning of the actuator 401 stroke (i.e., when the finger wedge barrier 300 is in the stowed configuration), enables the actuator mechanism 400 to accelerate the finger wedge barrier 300 faster and/or requires less force to accelerate the finger wedge barrier 300 out of the stowed configuration compared to an embodiment in which the actuator 401 is directly coupled to the finger wedge barrier 300 and the actuator 401 is oriented at a small angle relative to the finger wedge barrier 300.

Additionally, in the illustrated embodiment, the actuator mechanism 400 has a relatively high mechanical advantage when the finger wedge barrier 300 is in the deployed configuration. The high mechanical advantage at the end of the actuator 401 stroke (i.e., when the finger wedge barrier 300 is in the deployed configuration), enables the actuator mechanism 400 to decelerate the finger wedge barrier 300 faster and/or requires less braking force to decelerate the finger wedge barrier 300 as the finger wedge barrier 300 reaches the deployed configuration compared to an embodiment in which the actuator 401 is directly coupled to the finger wedge barrier 300 and the actuator 401 is oriented at a small angle relative to the finger wedge barrier 300. Accordingly, the actuator mechanism 400 is configured to progressively accelerate and decelerate the finger wedge barrier 300 at the begging and the end, respectively, of the operation cycle (i.e., proximate to the stowed position and the deployed position), which results in less wear and smoother operation of the actuator mechanism 400 and the finger wedge barrier 300 compared to related art barricades because the finger wedge barrier 300 does not slam into the stowed position or the deployed position.

With continued reference to the embodiment illustrated in FIGS. 5A-5B, the actuator mechanism 400 also includes a pair of hinge pins 411 extending outward in opposite directions from the housing 402 of the actuator 401. The hinge pins 411 of the actuator mechanism 400 are accommodated in the openings 221 of the actuator support member 218 coupled to the second transverse member 211. In this manner, the actuator 401 is configured to rotate relative to the foundation frame 200 (i.e., the housing 402 of the actuator 401 is hingedly coupled to foundation frame 200) such that the actuator 401 is configured to rotate relative to the foundation frame 200 as the actuator 401 is actuated to rotate the finger wedge barrier 300 between the stowed and deployed configurations.

In the illustrated embodiment, the rod 403 of the actuator 401 is in an extended position when the finger wedge barrier 300 is in the stowed configuration, and the rod 403 of the actuator 401 is in a retracted position when the finger wedge barrier 300 is in the deployed configuration.

In the illustrated embodiment, when the finger wedge barrier 300 is in the stowed configuration (i.e., the open road configuration), the first and second linkages 404, 405 are configured to attenuate shocks imparted by a vehicle passing over the barricade 100 and thereby isolate or at least mitigate against the transmission of shocks to the actuator 401. Reducing the transmission of shocks to the actuator 401 when a vehicle passes over the barricade 100 in the stowed configuration is configured to reduce the wear on the actuator 401 compared to an embodiment in which the actuator 401 is directly coupled to the finger wedge barrier 300 of the barricade 100. Otherwise, the transmission of shocks to the actuator 401 from a vehicle passing over the barricade 100 in the stowed configuration may break or prematurely wear the actuator 401.

Additionally, in one or more embodiments, the first and second linkages 404, 405 of the actuator mechanism 400 are configured to eliminate the need for a spring commonly found on conventional finger barricades and to eliminate the need for an air strut commonly utilized on other conventional barricades. Springs and air struts are prone to failure and require regular maintenance to ensure continued operation. Accordingly, in one or more embodiments, the barrier 100 does not include a spring or an air strut, which eliminates a potential point of failure and reduces the maintenance required to ensure continued operation of the barricade 100.

In operation, when the actuator 401 is actuated to move the finger wedge barrier 300 of the barrier 100 from the stowed position (shown in FIG. 5A) into the deployed position (shown in FIG. 5B), the rod 403 of the actuator 401 is drawn further into the housing 402 of the actuator 400. The movement of the rod 403 further into the housing 402 of the actuator 401 causes the first linkage 404 to rotate in a first direction (e.g., clockwise) and the second linkage 405 to rotate in a second direction (e.g., counterclockwise) opposite the first direction (e.g., the rod 403 of the actuator 401 pulls on the first ends 406, 409 of the first and second linkages 404, 405, respectively, such that first and second linkages 404, 405 move toward each other and an interior angle between the first and second linkages 404, 405 is reduced). As the first linkage 404 rotates in the first direction, the first linkage 404 pulls downward on the rear end portion of the finger wedge barrier 300, which causes the finger wedge barrier 300 to rotate in a first direction about the hinge (i.e., the hinge pins 305 and the hinge pin receptacles 212) such that the rear end of the finger wedge barricade 300 extends further downward into the interior space 208 of the foundation frame 200 and the front portion of the finger wedge barrier 300 extends upward out of the interior space 208 of the foundation frame 200. In this manner, the actuator 401 and the first linkage 404 are configured to pull the rear end portion of the finger wedge barrier 300 downward to rotate the finger wedge barrier 300 into the deployed configuration. As described above, the relatively high mechanical advantage of the actuator mechanism 400 when the finger wedge barrier 300 is in the stowed configuration and when the finger wedge barrier 300 is the in the deployed configuration enables the actuator mechanism 400 to quickly accelerate the finger wedge barrier 300 out of the stowed configuration and to quickly deaccelerate the finger wedge barrier 300 as it approaches the deployed configuration.

Additionally, In the illustrated embodiment, the actuator 401 is oriented parallel or substantially parallel to the foundation frame 200 when the finger wedge barrier 300 is in the stowed configuration (shown in FIG. 5A), and the actuator 401 rotates upward (i.e., in the same direction as the finger wedge barrier 300) relative to the foundation frame 200 as the finger wedge barrier 300 moves into the deployed configuration.

In operation, to return the finger wedge barrier 300 of the barricade 100 into the stowed configuration (shown in FIG. 5A), the actuator 401 may be actuated such that the rod 403 extends further out of the housing 402. The movement of the rod 403 further out of the housing 402 of the actuator 401 causes the first linkage 404 to rotate in a second direction (e.g., counterclockwise) opposite the first direction, and causes the second linkage 405 to rotate in a first direction (e.g., clockwise) (i.e., the rod 403 of the actuator 401 pushes on the first ends 406, 409 of the first and second linkages 404, 405, respectively, such that the first and second linkages 404, 405 move away each other and the interior angle between the first and second linkages 404, 405 is increased). As the first linkage 404 rotates in the second direction, the first linkage 404 pushes upward on the rear end portion of the finger wedge barrier 300, which causes the finger wedge barrier 300 to rotate in a second direction about the hinge (i.e., the hinge pins 305 and the hinge pin receptacles 212) such that the rear end of the finger wedge barricade 300 moves upward in the interior space 208 of the foundation frame 200 and the front portion of the finger wedge barrier 300 moves downward toward the interior space 208 of the foundation frame 200. In this manner, the actuator 401 and the first linkage 404 are configured to push the rear end portion of the finger wedge barrier 300 upward to rotate the finger wedge barrier 300 into the stowed configuration. As described above, the relatively high mechanical advantage of the actuator mechanism 400 when the finger wedge barrier 300 is in the stowed configuration and when the finger wedge barrier 300 is the in the deployed configuration enables the actuator mechanism 400 to quickly accelerate the finger wedge barrier 300 out of the deployed configuration and to quickly deaccelerate the finger wedge barrier 300 as it approaches the stowed configuration.

FIG. 6 is a graph depicting the torque supplied by the actuator mechanism 400 to the finger wedge barrier 300 as a function of the angle of the finger wedge barrier 300 relative to the foundation frame 200. In FIG. 6, a zero-degree angle corresponds to the finger wedge barrier 300 being in the stowed configuration, and the approximately 45-degree angle corresponds to the finger wedge barrier 300 being in the fully deployed configuration. FIG. 6 also depicts the gravitational torque acting on the finger wedge barrier 300 as a function of the angle of the finger wedge barrier 300 relative to the foundation frame 200. The gravitational torque acting on the finger wedge barrier 300 tends to bias the finger wedge barrier 300 into the stowed configuration, and the gravitational torque acting on the finger wedge barrier 300 must be overcome by the actuator mechanism 400 to move the finger wedge barrier 300 into the deployed configuration. As described above, the actuator mechanism 400 has a relatively high mechanical advantage when the finger wedge barrier 300 is in the stowed configuration, and therefore the actuator mechanism 400 is configured to supply a torque on the finger wedge barrier 300 that significantly exceeds the gravitational torque acting on the finger wedge barrier 300 when the finger wedge barrier 300 is in the stowed configuration, as shown in Region I in FIG. 6 that extends from zero degrees to approximately 15 degrees. The relatively high mechanical advantage of the actuator mechanism 400 when the finger wedge barrier 300 is in the stowed configuration enables the actuator mechanism 400 to quickly accelerate the finger wedge barrier 300 from the stowed configuration. In Region II in FIG. 6, which extends from approximately 15 degrees to approximately 25 degrees, the torque supplied by the actuator mechanism 400 to the finger wedge barrier 300 slightly exceeds the gravitational torque operating on the finger wedge barrier 300. Additionally, as described above, the actuator mechanism 400 has a relatively high mechanical advantage when the finger wedge barrier 300 is in the deployed configuration, and therefore actuator mechanism 400 is configured to supply a torque on the finger wedge barrier 300 that significantly exceeds the gravitational torque acting on the finger wedge barrier 300 when the finger wedge barrier 300 is in the deployed configuration, as shown in Region III in FIG. 6 that extends from approximately 25 degrees to approximately 45 degrees. The relatively high mechanical advantage of the actuator mechanism 400 when the finger wedge barrier 300 is in the deployed configuration enables the actuator mechanism 400 to quickly decelerate the finger wedge barrier 300 when it approaches the deployed configuration.

Accordingly, as illustrated in FIG. 6, a difference between the torque supplied to the finger wedge barrier 300 by the actuator mechanism 400 and a gravitational torque acting on the finger wedge barrier 300 is greater when finger wedge barrier 300 is in the stowed configuration than when the finger wedge barrier 300 is in an intermediate configuration between the stowed configuration and the deployed configuration. Additionally, a difference between the torque supplied to the finger wedge barrier 300 by the actuator mechanism 400 and a gravitational torque acting on the finger wedge barrier 300 is greater when finger wedge barrier 300 is in the deployed configuration than when the finger wedge barrier 300 is in an intermediate configuration between the stowed configuration and the deployed configuration.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is referred to as being "coupled" to another component, it can be directly attached to the other component or intervening components may be present therebetween.

What is claimed is:

1. A method of actuating a rotatable component of a barricade between a stowed configuration and a deployed configuration, the method comprising:
    pulling, with an actuator mechanism comprising an actuator and a linkage, a rear end portion of the rotatable component downward to move the rotatable component into the deployed configuration; and
    pushing, with the actuator mechanism, the rear end portion of the rotatable component upward to move the rotatable component into the stowed configuration, wherein a difference when pulling between a torque supplied to the rotatable component by the actuator mechanism and a gravitational torque acting on the rotatable component is greater when the rotatable component is in the stowed configuration than when the rotatable component is in an intermediate configuration between the stowed configuration and the deployed configuration.

2. The method of claim 1, wherein the rotatable component is a finger wedge barrier.

3. The method of claim 1, wherein, when the rotatable component is in the stowed configuration, an angle between the linkage and the rotatable component is greater than an angle between the actuator and the rotatable component.

4. The method of claim 1, wherein the rotatable component is a vehicle barrier.

5. The method of claim 4, wherein pulling comprises applying a first torque to the vehicle barrier by the actuator mechanism to overcome a second torque acting on the vehicle barrier due to gravity.

6. A method of actuating a rotatable component of a barricade between a stowed configuration and a deployed configuration, the method comprising:
    pulling, with an actuator mechanism comprising an actuator and a linkage, a rear end portion of the rotatable component downward to move the rotatable component into the deployed configuration; and
    pushing, with the actuator mechanism, the rear end portion of the rotatable component upward to move the rotatable component into the stowed configuration, wherein pulling comprises applying a first torque to the vehicle barrier by the actuator mechanism to overcome a second torque acting on the vehicle barrier due to gravity, wherein the difference when pulling between the first and the second torque is greater when the barrier is in the stowed configuration than when the barrier is in an intermediate configuration between the stowed configuration and the deployed configuration.

7. The method of claim 6, wherein the rotatable component is a finger wedge barrier.

8. The method of claim 6, wherein, when the rotatable component is in the stowed configuration, an angle between the linkage and the rotatable component is greater than an angle between the actuator and the rotatable component.

9. The method of claim 6, wherein the rotatable component is a vehicle barrier.

10. A method of actuating a rotatable component of a barricade between a stowed configuration and a deployed configuration, the method comprising:
    pulling, with an actuator mechanism comprising an actuator and a linkage, a rear end portion of the rotatable component downward to move the rotatable component into the deployed configuration, wherein pulling causes said linkage to rotate relative to said rotatable component; and
    pushing, with the actuator mechanism, the rear end portion of the rotatable component upward to move the rotatable component into the stowed configuration, wherein said pushing causes said linkage to rotate relative to said rotatable component.

11. The method of claim 10, wherein the rotatable component is a finger wedge barrier.

12. The method of claim 10, wherein, when the rotatable component is in the stowed configuration, an angle between the linkage and the rotatable component is greater than an angle between the actuator and the rotatable component.

13. The method of claim 10, wherein a difference between a torque supplied to the rotatable component by the actuator mechanism and a gravitational torque acting on the rotatable component is greater when the rotatable component is in the stowed configuration than when the rotatable component is in an intermediate configuration between the stowed configuration and the deployed configuration.

14. The method of claim 10, wherein the rotatable component is a vehicle barrier.

15. The method of claim 14, wherein pulling comprises applying a first torque to the vehicle barrier by the actuator mechanism to overcome a second torque acting on the vehicle barrier due to gravity, wherein the difference between the first and the second torque is greater when the barrier is in the stowed configuration than when the barrier is in an intermediate configuration between the stowed configuration and the deployed configuration.

* * * * *